(12) United States Patent
Yamasaki et al.

(10) Patent No.: US 9,996,940 B1
(45) Date of Patent: Jun. 12, 2018

(54) EXPRESSION TRANSFER ACROSS TELECOMMUNICATIONS NETWORKS

(71) Applicant: Connectivity Labs Inc., Cupertino, CA (US)

(72) Inventors: Thomas Yamasaki, Anaheim Hills, CA (US); Rocky Chau-Hsiung Lin, Cupertino, CA (US); Koichiro Kanda, San Jose, CA (US)

(73) Assignee: Connectivity Labs Inc., Cupertino, CA (US)

( * ) Notice: Subject to any disclaimer, the term of this patent is extended or adjusted under 35 U.S.C. 154(b) by 0 days. days.

(21) Appl. No.: 15/793,478

(22) Filed: Oct. 25, 2017

(51) Int. Cl.
| | |
|---|---|
| *G06T 7/246* | (2017.01) |
| *G06T 1/00* | (2006.01) |
| *G06T 11/60* | (2006.01) |
| *G06T 13/80* | (2011.01) |

(52) U.S. Cl.
CPC ............ *G06T 7/246* (2017.01); *G06T 1/0007* (2013.01); *G06T 11/60* (2013.01); *G06T 13/80* (2013.01); *G06T 2207/30201* (2013.01)

(58) Field of Classification Search
CPC ........ G06T 1/0007; G06T 11/60; G06T 13/80
See application file for complete search history.

(56) References Cited

U.S. PATENT DOCUMENTS

| | | | |
|---|---|---|---|
| 8,692,830 B2 | 4/2014 | Nelson et al. | |
| 8,694,899 B2 | 4/2014 | Goossens et al. | |
| 8,797,331 B2 * | 8/2014 | Sano | G06T 13/40 |
| | | | 345/474 |
| 9,251,406 B2 * | 2/2016 | Lempel | G06Q 30/0255 |
| 9,406,162 B2 * | 8/2016 | Lucey | G06T 13/20 |
| 9,589,357 B2 * | 3/2017 | Li | G06T 13/40 |
| 9,838,597 B2 * | 12/2017 | Uemura | H04N 5/23219 |
| 9,842,164 B2 * | 12/2017 | Lee | G06F 17/30861 |
| 9,852,548 B2 * | 12/2017 | Greco | G06T 7/70 |
| 9,881,420 B2 * | 1/2018 | Miller | G06T 19/006 |

OTHER PUBLICATIONS

The future is here: iPhone X, Apple Newsroom, available at https://www.apple.com/newsroom/2017/09/the-future-is-here-iphone-x/, Sep. 12, 2011.

(Continued)

*Primary Examiner* — Edward Park
(74) *Attorney, Agent, or Firm* — Perkins Coie LLP

(57) ABSTRACT

Methods, devices, and systems for expression transfer are disclosed. The disclosure includes capturing a first image of a face of a person. The disclosure includes generating an avatar based on the first image of the face of the person, with the avatar approximating the first image of the face of the person. The disclosure includes transmitting the avatar to a destination device. The disclosure includes capturing a second image of the face of the person on a source device. The disclosure includes calculating expression information based on the second image of the face of the person, with the expression information approximating an expression on the face of the person as captured in the second image. The disclosure includes transmitting the expression information from the source device to the destination device. The disclosure includes animating the avatar on a display component of the destination device using the expression information.

19 Claims, 18 Drawing Sheets

(56) References Cited

OTHER PUBLICATIONS

Warren, T., Apple announces Animoji, animated emoji for iPhone X, The Verge, available at https://www.theverge.com/2017/9/12/16290210/new-iphone-emoji-animated-animoji-apple-ios-11-update, Sep. 12, 2011.

Brogan, J., The New iPhone's Most Adorable Feature Is Also Its Most Troubling, Slate, available at http://www.slate.com/blogs/future_tense/2017/09/12/three_reasons_why_apple_s_iphone_x_animojis_are_worrisome.html, Sep. 12, 2017.

* cited by examiner

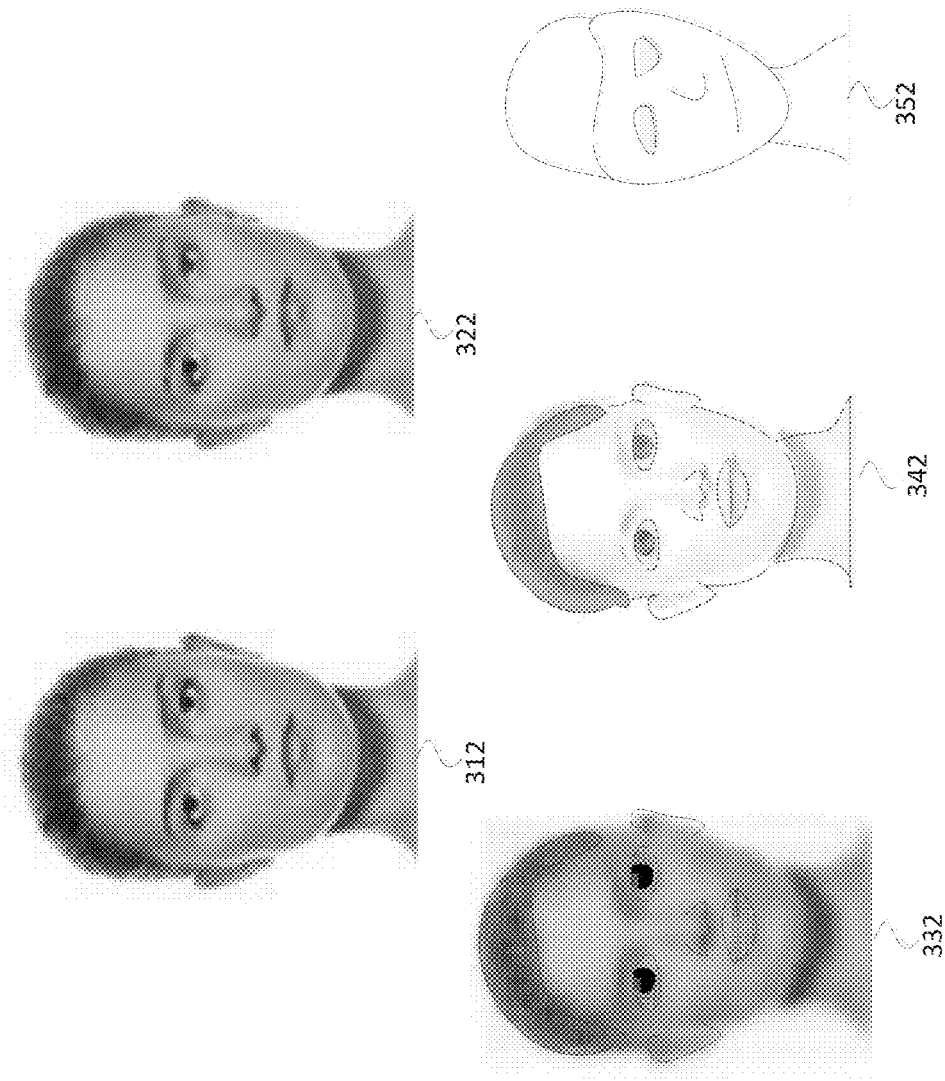

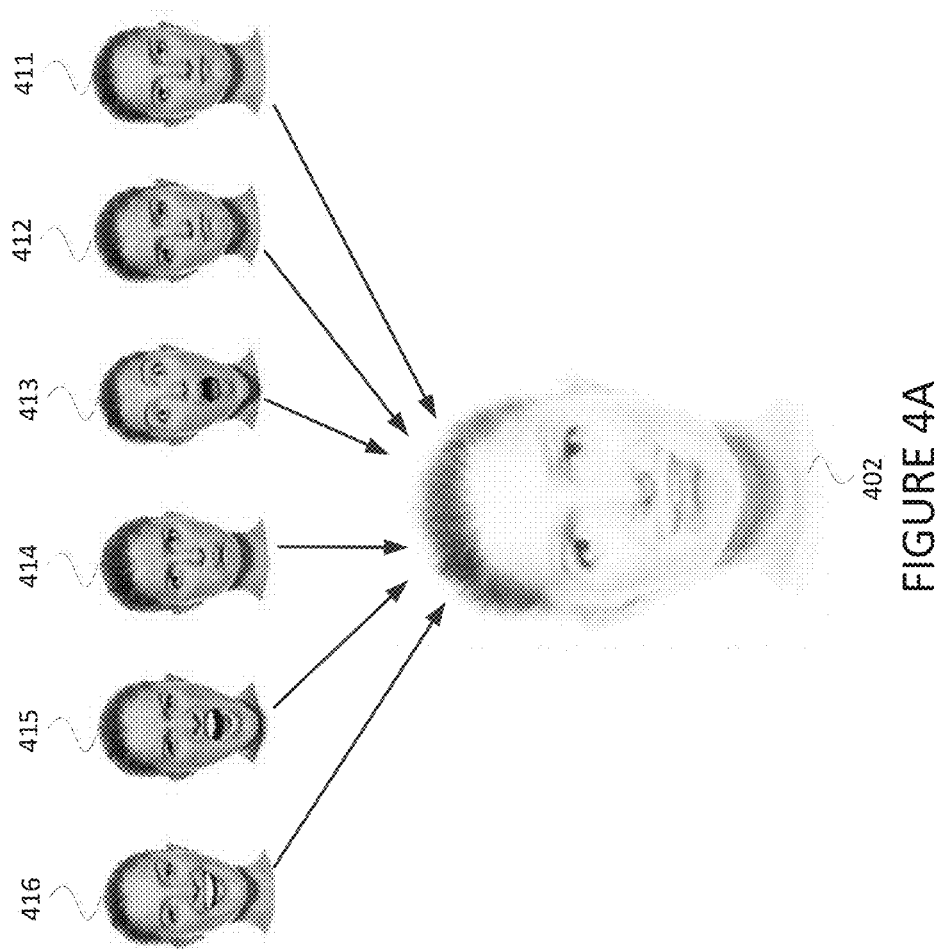

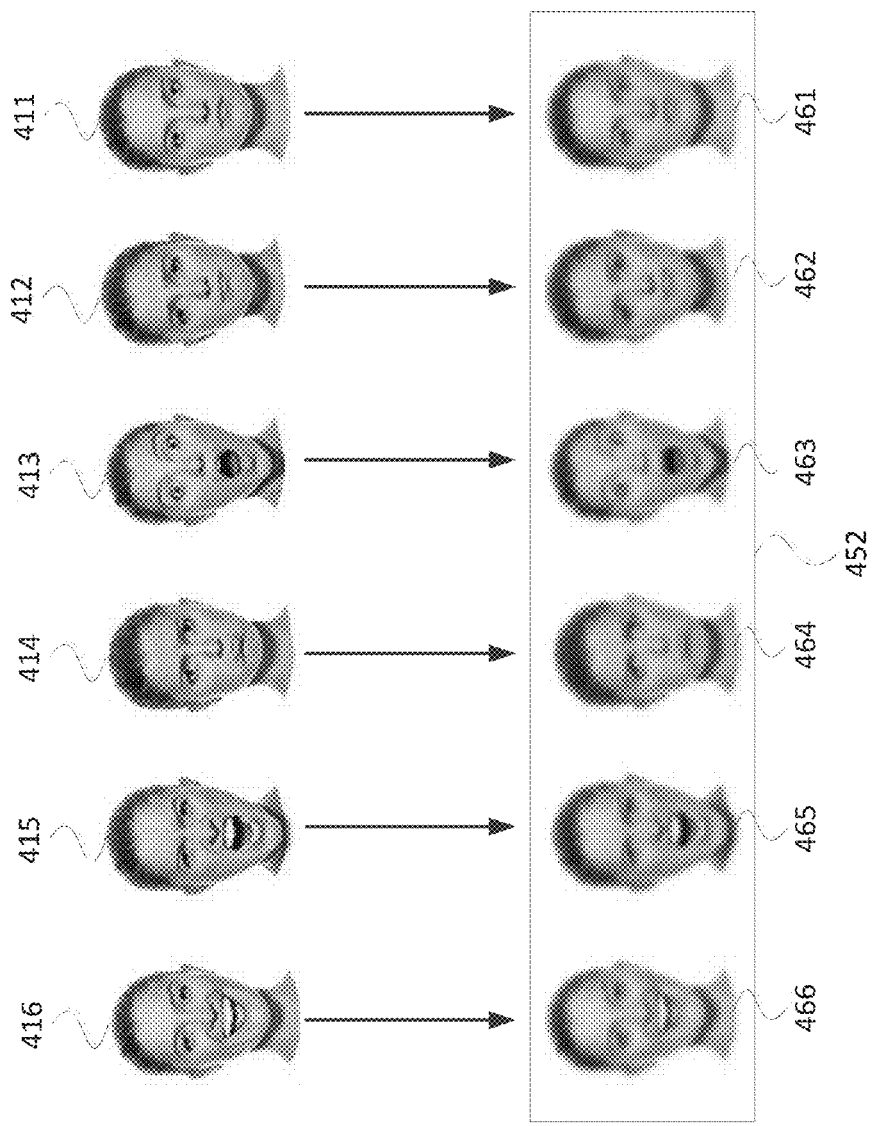

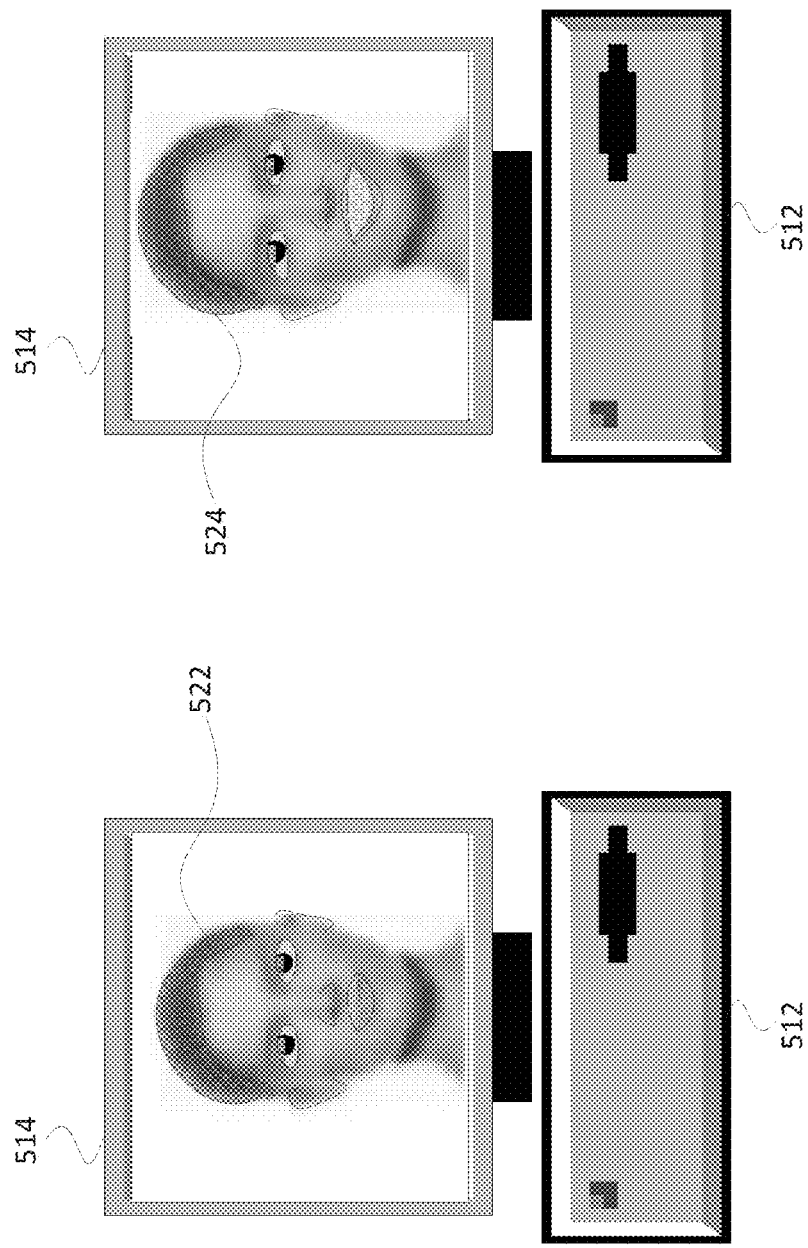

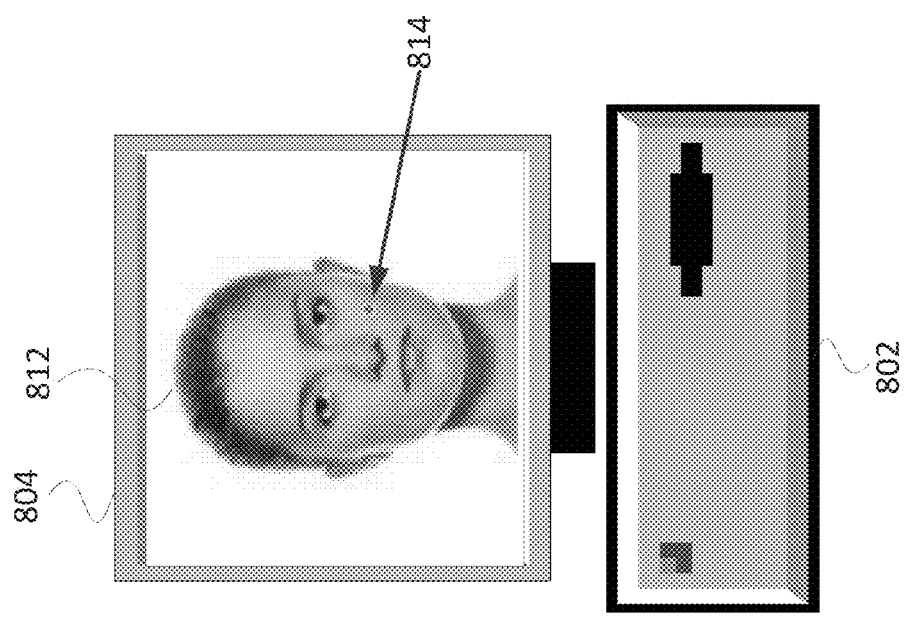

920

| landmark | location |
|---|---|
| 621 | (4.8, 3.9) |
| 622 | (4.6, 7.0) |
| 623 | (4.9, 3.1) |
| 624 | (4.8, 4.8) |
| 625 | (4.7, 7.9) |
| 626 | (4.7, 6.2) |
| 627 | (4.3, 2.8) |
| 628 | (4.3, 4.9) |
| 629 | (4.1, 8.0) |
| 630 | (4.2, 6.0) |
| 641 | (6.2, 5.5) |
| 642 | (6.4, 5.2) |
| 643 | (6.4, 6.0) |
| 651 | (7.0, 5.5) |
| 652 | (7.6, 5.5) |
| 653 | (7.3, 4.5) |
| 654 | (7.3, 6.8) |

| landmark | motion vector |
|---|---|
| 621 | (0.0, 0.0) |
| 622 | (0.0, 0.0) |
| 623 | (-0.2, 0.0) |
| 624 | (0.0, 0.0) |
| 625 | (+0.2, 0.0) |
| 626 | (0.0, 0.0) |
| 627 | (0.0, 0.0) |
| 628 | (-0.4, 0.0) |
| 629 | (0.0, 0.0) |
| 630 | (-0.4, 0.0) |
| 641 | (0.0, 0.0) |
| 642 | (0.0, 0.0) |
| 643 | (0.0, 0.0) |
| 651 | (-0.3, 0.0) |
| 652 | (+0.6, 0.0) |
| 653 | (0.0, -0.4) |
| 654 | (0.0, +0.4) |

FIGURE 9C

EXPRESSION TRANSFER ACROSS TELECOMMUNICATIONS NETWORKS

TECHNICAL FIELD

This patent document relates to systems, devices, and processes that simulate human expressions in telecommunications environments.

BACKGROUND

Telecommunications systems support a variety of exchanges of visual information. In one common example, two humans may each have separate electronic devices capable of video capture and video playback. When the two humans are remote from one another, they may conduct a real-time video call, where each human views a real-time video captured of the other human. The real-time video transmitted between the two electronic devices typically includes a series of still images that show the face, body, etc. of the human captured in the video. The series of still images showing the face, body, etc. of the human is then displayed using the electronic device of the other human.

SUMMARY

According to some embodiments a method is provided. The method includes capturing a first image of a face of a person. The method includes generating an avatar based on the first image of the face of the person. The avatar approximates the first image of the face of the person. The method includes transmitting the avatar to a destination device. The method includes capturing a second image of the face of the person on a source device. The method includes calculating expression information based on the second image of the face of the person. The expression information approximates an expression on the face of the person as captured in the second image. The method includes transmitting the expression information from the source device to the destination device. The method includes animating the avatar on a display component of the destination device using the expression information.

According to some embodiments, the calculating the expression information, the transmitting the expression information, and the animating the avatar are performed substantially in real-time with the capturing the second image of the face of the person.

According to some embodiments, the method includes capturing audio information using an audio input component of the source device. The method includes transmitting the audio information from the source device to the destination device. The method includes outputting the audio information using the destination device.

According to some embodiments, the capturing the audio information, the transmitting the audio information, and the outputting the audio information are performed substantially in real-time with the capturing the second image of the face of the person.

According to some embodiments the expression information includes facial landmark indicators.

According to some embodiments, the expression information includes a motion vector of facial landmark indicators.

According to some embodiments, the method includes generating a second avatar that approximates the face of the person. The method includes receiving a user input indicating a facial avatar to use. The method includes selecting the avatar based on the user input, wherein the selecting the avatar is performed prior to the transmitting the avatar to the destination device.

According to some embodiments, the avatar is a photo-realistic avatar, and the second avatar is a generic avatar.

According to some embodiments, the real-time image of the face of the person is not transmitted from the source device to the destination device.

According to some embodiments, the method includes receiving a user input to modify a visual aspect of the avatar. The method includes modifying a visual aspect of the avatar based on the received user input. The receiving the user input and the modifying the visual aspect of the avatar are performed prior to the transmitting the avatar to the destination device.

According to some embodiments, a system is provided. The system includes one or more source devices. The one or more source devices are configured to capture a first image of a face of a person. The one or more source devices are configured to generate an avatar based on the first image of the face of the person, wherein the avatar approximates the first image of the face of the person. The one or more source devices are configured to transmit the avatar to a destination device. The one or more source devices are configured to capture a second image of the face of the person. The one or more source devices are configured to calculate expression information based on the second image of the face of the person. The expression information approximates an expression on the face of the person as captured in the second image. The one or more source devices are configured to transmit the expression information to the destination device. The system includes the destination device configured animate the avatar on a display component using the expression information.

According to some embodiments, the one or more source devices are configured to capture the second image of the face of the person, calculate the expression information, and transmit the expression information substantially in real-time with the destination device animating the avatar.

According to some embodiments, the one or more source devices are further configured to capture audio information using an audio input component. The one or more source devices are further configured to transmit the audio information to the destination device. The destination device is further configured to output the audio information.

According to some embodiments, the one or more source devices is configured to capture the second image of the face of the person, capture the audio information, and transmit the audio information substantially in real-time with the destination device outputting the audio information.

According to some embodiments, the expression information comprises facial landmark indicators.

According to some embodiments, the expression information comprises a motion vector of facial landmark indicators.

According to some embodiments, the one or more source devices are further configured to generate a second avatar that approximates the face of the person. The one or more source devices are further configured to receive a user input indicating a facial avatar to use. The one or more source devices are further configured to select the avatar based on the user input. The one or more source devices are configured to select the avatar prior to transmitting the avatar to the destination device.

According to some embodiments, the avatar is a photo-realistic avatar. The second avatar is a generic avatar.

According to some embodiments, the real-time image of the face of the person is not transmitted from the source device to the destination device.

According to some embodiments, the one or more source devices are further configured to receive a user input to modify a visual aspect of the avatar. The one or more source devices are further configured to modify a visual aspect of the avatar based on the received user input. The one or more source devices receive the user input and modify the visual aspect of the avatar prior to the transmitting the avatar to the destination device.

BRIEF DESCRIPTION OF THE DRAWINGS

FIG. 3 is a diagram of an approach for avatar generation according to some embodiments.

FIG. 4A is a diagram of an approach for avatar generation according to some embodiments.

FIG. 4B is a diagram of an approach for avatar generation according to some embodiments.

FIG. 5A is a diagram of avatar animation according to some embodiments.

FIG. 5B is a diagram of avatar animation according to some embodiments.

FIG. 8A is a diagram of an approach for avatar modification according to some embodiments.

FIG. 9B is a diagram of an approach for calculation of expression information according to some embodiments.

FIG. 9C is a diagram of an approach for calculation of expression information according to some embodiments.

DETAILED DESCRIPTION

Figure 1:
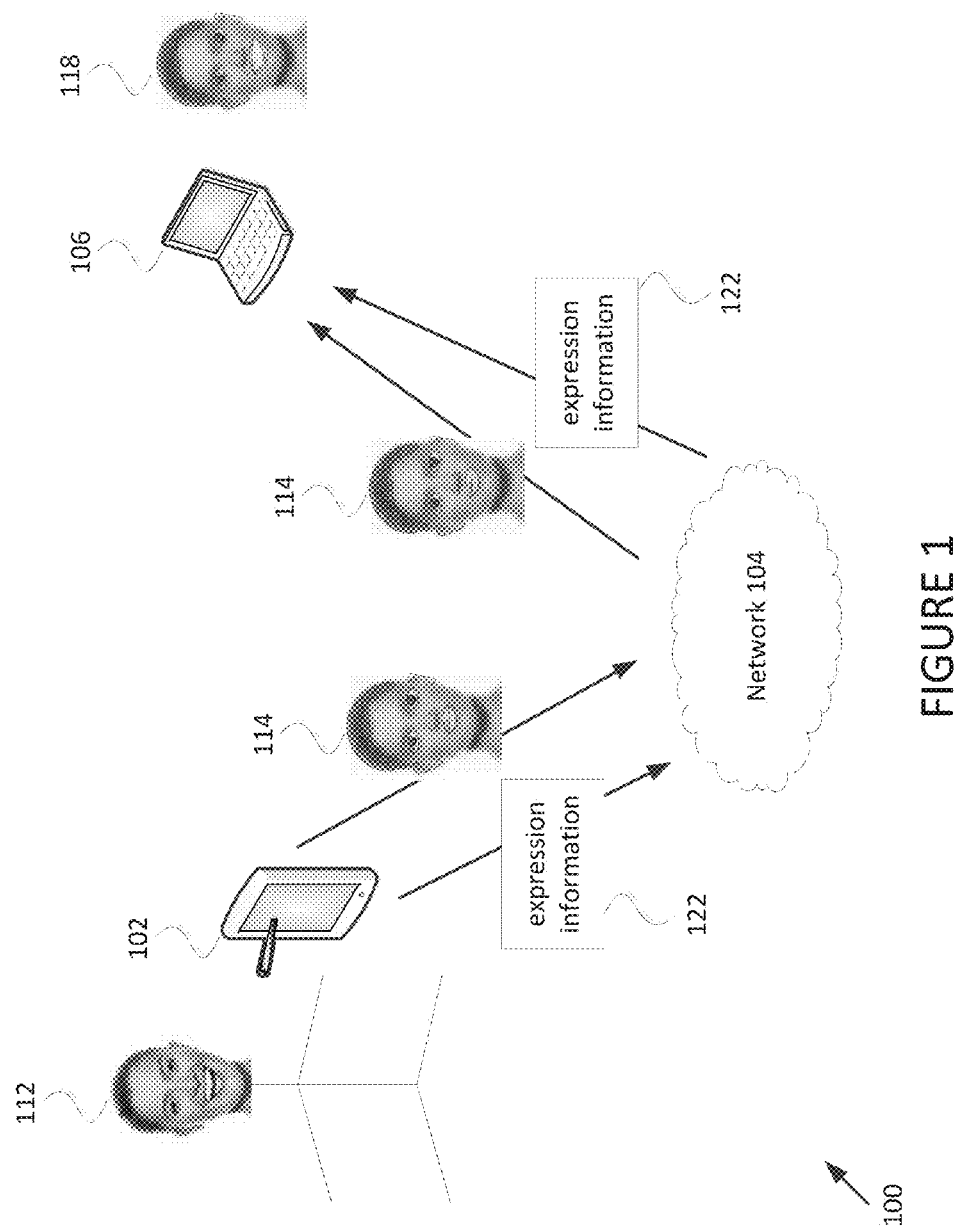
FIG. 1 is a diagram of an expression transfer system according to some embodiments.

Video calling has been and remains an incredibly popular technology. This popularity can be attributed to numerous benefits that result from the addition of video to the traditional audio component of a call.

First, a large quantity of communicative content is communicated using non-verbal cues (e.g., frown vs. smile, furrowed eyebrows, lack of eye contact, head held upright or dropped). Thus a video call allows more information to be exchanged between the parties from the same interaction.

Second, the video content can facilitate smoother conversation. Audio-only calls often involve accidental interruptions or two persons simultaneous starting to talk at once, followed by an awkward dance akin to a sort of human binary exponential backoff procedure. With video, one person can signal the intent to begin talking by facial expressions, such as opening of the mouth, positioning of the head closer and pointed directly at the camera, etc. Thus video calls can better simulate smooth, in-person conversations than can audio-only calls.

Third, the video content can better create the sense of physical presence. Even where video content is low quality, choppy, or delayed, the video content can create a greater sense that the person shown in the video content is physically present with the viewer than would the audio content alone. At least to some degree, this has to be observed as one of the rationales for using the older satellite video technologies that, though the video was regularly low quality and highly delayed, still provided a fuller experience to the viewer than audio content alone.

For at least these reasons, and no doubt many others, video calls that include video content along with audio content have become the preferred form of communication over audio-only calls, at least where a video call is possible.

But that is not to say that video calls are without problems. There are several unique problems introduced by the use of video calls, as well as some problems that, though perhaps not unique to video calls, are greatly exacerbated by the use of video calls so as to create essentially a new form of technical challenge.

First and foremost among these problems is the incredible throughput requirements for video calls. Standard video is simply a series of still images. And when a single still image can be several megabytes worth of data, and the video constitutes tens, hundreds, or even thousands of such images every second, it is easy to see that there will be problems with transmitting this video in real-time between two electronic devices. This problem is further exacerbated by the fact that one of the more common use cases for video calls is with the use of smartphones over cellular networks. Cellular networks, owing to their long-range communications, high loading, and bandwidth limitations, often struggle to support the high throughput required for video calls. And even though great advances have been made in video compression and cellular communication technologies in recent years, the throughput requirements of video calls remains a significant challenge.

Second, video calls have the ability and the tendency to result in communication of too much information. In particular, a person partaking in a video call will expose far more information than would be exposed with an audio-only call. While some of this information, such as non-verbal cues embodied in facial expressions may be advantageous to expose, much of this information is not. For example, a person on a video call typically cannot avoid showing a messy room in the background (e.g., a messy home office during a business call). As another example, a person on a video call typically cannot avoid showing the imperfections and informality of the person at that moment (e.g., messy hair, unprofessional clothing, or lack of makeup). As another example, a person on a video call typically cannot avoid showing distractions occurring in the background of the video (e.g., child entering the room during a business call, the fact that the person is in the bathroom).

The inventors having made the foregoing observations about the nature of video calls, the inventors recognize the need for an improved technology that maintains as many benefits of existing video calls as possible while also reducing some of the undesirable side effects.

FIG. 1 is a diagram of an expression transfer system 100 according to some embodiments. The system 100 includes a computing device 102, a network 104, and a computing device 106.

The computing device 102 may be a computing device that contains video input components, video output components, audio input components, and audio output components for interacting with a human user 112 of the computing device 102. The computing device 102 may be provided as an of a variety of computing devices capable of performing video calls (e.g., a tablet computer, a smartphone, a laptop computer, a desktop computer, etc.). The computing device 102 may use a transceiver component to send information to and receive information from the network 104. The computing device 102 may include a processor (e.g., a microprocessor, a field programmable gate array, etc.) for performing computing operations. The computing device 102 may include a storage component (e.g., hard drive, flash memory, etc.) for storing information related to expression transfer.

The computing device 106 may be a computing device that contains video input components, video output components, audio input components, and audio output components for interacting with a human user (not pictured) of the computing device 106. The computing device 106 may be provided as an of a variety of computing devices capable of performing video calls (e.g., a tablet computer, a smartphone, a laptop computer, a desktop computer, etc.). The computing device 106 may use a transceiver component to send information to and receive information from the network 104. The computing device 106 may include a processor (e.g., a microprocessor, a field programmable gate array, etc.) for performing computing operations. The computing device 106 may include a storage component (e.g., hard drive, flash memory, etc.) for storing information related to expression transfer.

The network 104 may be a telecommunications network capable of relaying information between the computing device 102 and the computing device 106. For example, the network 104 may include a cellular telephone network. As another example, the network 104 may include a personal area network. As another example, the network 104 may include a satellite communications network.

The system 100 including the computing device 102, the network 104, and the computing device 106 may be configured to perform expression transfer as now described.

The computing device 102 may use a camera to capture an image of the user 112. This image may include the face of the user 112, other body parts of the user 112 (such as the neck and shoulders), and a background of the environment in which the user 112 is located.

The computing device 102 may use the captured image of the user 112 to generate an avatar 114 for the user 112. The avatar 114 may be a visual representation of the user 112. In particular, the avatar 114 may be an image that bears a resemblance to the face of the user 112 (as captured in the image of the user 112 by the computing device 102) but that is different from the actual captured image of the user 112. For instance, the avatar 114 may be a graphic whose pixels are defined based on using chrominance and luminance values from the captured image of the user 112. The avatar 114 may be a simplified representation of the captured image of the user 112, such as by smoothing pixel values from the captured image of the user 112 to create a lower-detail image that, while bearing resemblance to the face of the user 112, is distinct from the actual captured image of the user 112.

The computing device 102 may transmit the avatar 114 to the computing device 106 using the network 104. This transmission may involve transmitting a serialization of bit values that represent the avatar 114. Any other suitable form of transmitting an image, graphic, animation, or other digital file may be used.

The computing device 102 may capture an additional image of the user 112. The additional captured image may include the face of the user 112. The computing device 102 may generate expression information 122 based on the additional captured image of the user 112. The expression information may include data describing an expression on the face of the user 112 as shown in the additional captured image. For example, the expression information 122 may include data describing the location of the eyes, mouth, nose, cheeks, ears, etc. of the user 112. This expression information 122 may thereby embody whether the user 112 is smiling, frowning, showing a puzzled expression, showing an angry expression, etc.

The computing device 102 may transmit the expression information 122 to the computing device 106 using the network 104. This transmission may involve transmitting a serialization of bit values that represent the expression information 122. Any other suitable form of transmitting data or other digital files may be used.

The computing device 106 may receive the avatar 114 and the expression information 122 from the computing device 102 using the network 104. The computing device 106 may animate the avatar 114 using the expression information 122. For example, the computing device 106 may display the avatar 114 on a display screen of the computing device 106 devoid of any expression (e.g., using a default "blank" expression as pictured). When the computing device 106 receives the expression information 122, it may alter the avatar 114 in accordance with the expression information 122. For instance, if the expression information 122 indicates that the user 112 has her mouth wide, open and with the corners of the mouth above the bottom lip (i.e., the user 112 is smiling), the computing device 106 may animate the avatar 114 so that it displays an animated mouth with the same configuration, as shown with animated avatar 118. When the computing device 106 receives other expression information 122 (e.g., indicating that the user 112 is frowning, is showing an angry expression, etc.), the computing device 106 may update the animated avatar 118 to correspond to the updated expression information 122.

While substantially self-evident from the foregoing description, it should be noted that the second computing device 106 does not need to receive the actual captured image of the user 112 or the additional captured image of the user 112 in order to animate and display the animated avatar 118. That is, the computing device 102 may be able to transmit only the avatar 114 and the expression information 112 to the computing device 106, and thus forgo the transmission of any actual captured images of the user 112 to the computing device 106. In addition, the computing device 102 may be able to transmit the avatar 114 to the computing device 106 only once, as opposed to repeatedly transmitting the same content as is common in standard video streaming technology. It should be noted, though, that transmission of at least some actual captured images of the user 112 from the computing device 102 to the computing device 106 is not incompatible with the system 100. For instance, the computing device 102 may transmit regular or sporadic actual captured images of the user 112 to the computing device 106, whereupon the computing device 106 may interleave those images with display of the animated avatar 118.

An exemplary use case for the system 100 is now provided in order to assist in understanding the system 100.

The user 112 may be carrying the computing device 102 with her at some location, when she decides that she would like to speak to a user (not pictured) of the computing device 106. Because the user 112 and the computing device 102 are remote from a location where the computing device 106 and its user are located, the user 112 decides to make a video call to the user of the computing device 106.

Toward this end, the user 112 opens a software application on the computing device 102, selects an identifier for the user of the computing device 106, and selects a "call" option. At this point, the computing device 102 captures an image of the user 112, including the face of the user 112. The computing device 102 uses the captured image of the user 112 to generate the avatar 114, as described elsewhere herein.

The computing device 102 transmits the avatar 114 to the computing device 106 using the network 104.

The user of the computing device 106 receives an indication in a software application of the computing device 106 that there is an incoming video call from the user 112. The user of the computing device 106 selects an "answer" option.

At this point, the computing device 102 begins capturing images of the user 112 in a rapid and continuous fashion (i.e., the computing device 102 begins capturing video of the user 112). For each captured image of the user 112, the computing device 102 generates expression information 122 in real-time. The expression information 122 contains data that indicates an expression on the face of the user 112 at the moment that the respective image of the user 112 was captured.

The computing device 102 transmits expression information 122 to the computing device 106 using the network 104.

The computing device 106 receives the avatar 114 and the expression information 122 from the computing device 102 using the network 104. The computing device 106 uses the expression information 122 to animate the avatar 114 so as to produce the animated avatar 118 in real-time. The computing device 106 displays the animated avatar 118 on a display screen of the computing device 106 in real-time. Each time new expression information 122 is received (e.g., for each image or "frame" of the user 112 captured by the computing device 102), the computing device 106 may update the animated 118 to display the facial expression indicated by the updated expression information 122.

With this approach, the computing device 102 captures video of the user 112 in real-time. The computing device 106 displays an animated avatar 118 that approximates or otherwise simulates the face of the user 112 as shown in the video captured by the computing device 102. Thus the user of the computing device 106 is able to see a real-time animation of the user 112, and thus the user 112 and the user of the computing device 106 are capable of performing a real-time video call without the need for the computing device 106 to receive any real-time video from the computing device 102.

As described in the foregoing and elsewhere herein, the system 100 achieves numerous benefits for existing video call technology.

First, the system 100 using expression transfer maintains to a large extent the benefits of existing video call technology. Non-verbal communication embodied in facial expressions and body movement are still communicated to the recipient. Conversations are still smoother than with audio-only calls, because the cues that indicate an intention to start or stop talking are still displayed using the avatar. And, while the use of the animated avatar may not have the full feeling of physical presence as actual captured video, the animated avatar still purveys at least a reasonable sense of presence that goes well beyond audio-only calls.

Second, the system 100 eliminates or reduces several of the drawbacks of video call technology.

The system 100 greatly reduces the throughput requirements for a video call. Whereas standard video call technology may need to transmit information for 900,000+ pixels for each captured image, the system 100 is capable of transmitting a much smaller quantity of information in the form of the expression information 122 (as described elsewhere herein). This produces a reduction in bandwidth demand that is many order of magnitude.

The system 100 also reduces or eliminates oversharing issues involved in video calls. Distractions or undesirable conditions in a background environment of the user 112 (e.g., presence in bathroom, messy room) can be entirely removed by setting the animated avatar 118 on a blank background (e.g., solid white background). This thereby removes entirely any information about the background of the environment where the user 112 is located. Further, any undesirable condition of the user 112 herself can be reduced or eliminated. For example, the avatar 114 can be generated to have well maintained hair, any desirable level of makeup, any desirable type of clothing (e.g., as showing on the shoulders of the avatar).

Thus the use of expression transfer in the system 100 maintains the primary benefits of video call technology while reducing or eliminating the unique drawbacks created by video call technology.

While the foregoing video call use case illustrates one exemplary use of the system 100, it should be understood that this is an exemplary embodiment only, and other embodiments of the system 100 are possible.

In some embodiments, a user of the computing device 106 may also use the system 100 in order to send an avatar and expression information to the computing device 102 for viewing of an animated avatar by the user 112. That is, while the exemplary use case described with respect to the system 100 included a description of a "one-way" transmission of an avatar and expression information, it should be understood that a "two-way" transmission of an avatar and expression information can be used. This approach may be useful in a video call scenario where both the user 112 and the user (not pictured) of the computing device 106 desire to use the expression transfer technique in the video call. Thus, simultaneous, two-way transmission of expression information may be used in some embodiments.

In some embodiments, more than two users may transmit avatars and expression information simultaneously. For example, in a scenario where the users of the system 100 are engaged in a three-way, four-way, or greater arity video call, there may be three or more transmissions of expression information simultaneously and in real-time.

Another exemplary use case for the system 100 is in a virtual reality system. For example, the user 112 and a user (not pictured) of the computing device 106 may be present in a same virtual reality environment. In such embodiments, the animated avatar 118 may be an avatar for the user 112 in the virtual reality environment. As such, the system 100 may allow the user of the computing device 106 to view the animated avatar 118 as reflecting in real-time the expressions of the user 112. The system 100 may be used in other environments as well, such as computer gaming.

The system 100 can use additional types of expression information beyond those described previously. For example, the expression information 122 may be information indicating an expression on the face of the user 112 or a head motion made by the user 112. But the expression information 122 can also contain expression information that resulted from a translation of the actual expression information generated based on the captured image of the user 112. For instance, if the computing device 102 captures a sequence of images of the user 112 that show the user 112 nodding her head in an "okay" or "I am in agreement" gesture, then the computing device 102 may generate expression information indicating this head nodding motion. However, the computing device 102 may also perform a translating of the expression information. For instance, the computing device 102 may translate the calculated expression information that indicates a head nod gesture into expression information that indicates a head bobble gesture. The computing device 102 may then transmit the translated expression information as expression information 122. This approach may be advantageous when the user of the computing device 106 is of a culture that uses bodily expressions differently, such as if the user 112 is an American while the use of the computing device 106 is an Indian. The computing device 102 may determine to perform the translation of expression information based on input from the user 112, based on an indicator received from the computing device 106, based on a detected geographic location of the user 112, based on an indicated geographic location of the computing device 106, and/or on some other basis.

The system 100 may also use body language other than expression and head movement in order to generate expression information. For example, the computing device 102 may capture a movement of the shoulders, arms, hands, etc. of the user 112. The computing device 102 may generate expression information indicating this body motion.

Figure 2:
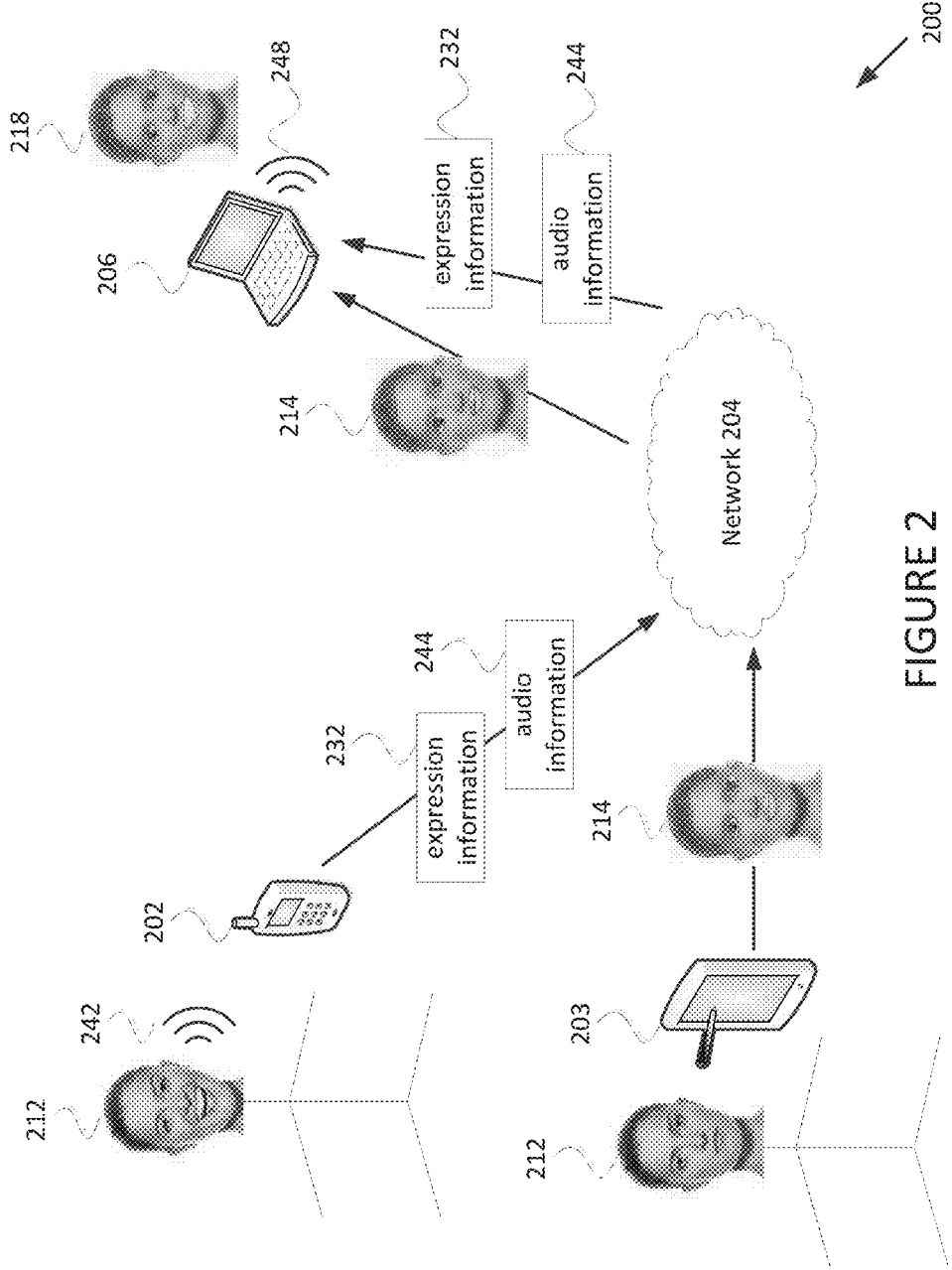
FIG. 2 is a diagram of an expression transfer system according to some embodiments.

FIG. 2 is a diagram of an expression transfer system 200 according to some embodiments. The system 200 includes a computing device 202, a computing device 203, a network 204, and a computing device 206.

The computing device 202 may be provided substantially as described elsewhere herein (e.g., the computing device 102).

The computing device 203 may be provided substantially as described elsewhere herein (e.g., the computing device 102).

The network 204 may be provided substantially as described elsewhere herein (e.g., the network 104).

The computing device 206 may be provided substantially as described elsewhere herein (e.g., the computing device 106).

The system 200 including the computing device 202, the computing device 203, the network 204, and the computing device 206 may be configured to perform expression transfer as now described.

The computing device 203 may use a camera to capture an image of the user 212. This image may include the face of the user 212, other body parts of the user 212 (such as the neck and shoulders), and a background of the environment in which the user 212 is located. In some embodiments, the camera may be a 3D camera.

The computing device 203 may use the captured image of the user 212 to generate an avatar 214 for the user 212. The avatar 214 may be a visual representation of the user 212. In particular, the avatar 214 may be an image that bears a resemblance to the face of the user 212 (as captured in the image of the user 212 by the computing device 203) but that is different from the actual captured image of the user 212. For instance, the avatar 214 may be a graphic whose pixels are defined based on using chrominance and luminance values from the captured image of the user 212. The avatar 214 may be a simplified representation of the captured image of the user 212, such as by smoothing pixel values from the captured image of the user 212 to create a lower-detail image that, while bearing resemblance to the face of the user 212, is distinct from the actual captured image of the user 212.

The computing device 203 may transmit the avatar 214 to the computing device 206 using the network 204. This transmission may involve transmitting a serialization of bit values that represent the avatar 214. Any other suitable form of transmitting an image, graphic, animation, or other digital file may be used. In some embodiments, while the avatar 214 transmitted by the computing device 203 may ultimately be received by the computing device 206, the avatar 214 may also be stored in a storage device provided as part of or connected to the network 204 (e.g., on a network attached storage device).

The computing device 202 may capture an image of the user 212. The captured image may include the face of the user 212. The computing device 202 may generate expression information 232 based on the captured image of the user 212. The expression information may include data describing an expression on the face of the user 212 as shown in the captured image. For example, the expression information 232 may include data describing the location of the eyes, mouth, nose, cheeks, ears, etc. of the user 212. This expression information 232 may thereby embody whether the user 212 is smiling, frowning, showing a puzzled expression, showing an angry expression, etc.

The computing device 202 may capture audio content 242 from the user 212. The audio content 242 may include words spoken by the user 212, other audible noises made by the user 212, or noise from a background environment of the user 212. The computing device 202 may use the captured audio content 242 to generate audio information 244. For example, the computing device 202 may capture audio content 242 as a series of air pressure values and convert the audio content 242 into digital data as audio information 244.

The computing device 202 may transmit the expression information 232 and the audio information 244 to the computing device 206 using the network 204. This transmission may involve transmitting a serialization of bit values that represent the expression information 232 and/or the audio information 244. Any other suitable form of transmitting data or other digital files may be used.

The computing device 206 may receive the avatar 214, the expression information 232, and the audio information 244 from the computing device 202 using the network 204.

The computing device 206 may animate the avatar 214 using the expression information 232. For example, the computing device 206 may display the avatar 214 on a display screen of the computing device 206 devoid of any expression (e.g., using a default "blank" expression as pictured). When the computing device 206 receives the expression information 232, it may alter the avatar 214 in accordance with the expression information 232. For instance, if the expression information 232 indicates that the user 212 has her mouth wide, open and with the corners of the mouth above the bottom lip (i.e., the user 212 is smiling), the computing device 206 may animate the avatar 214 so that it displays an animated mouth with the same configuration, as shown with animated avatar 218. When the computing device 206 receives other expression information 232 (e.g., indicating that the user 212 is frowning, is showing an angry expression, etc.), the computing device 206 may update the animated avatar 218 to correspond to the updated expression information 232.

The computing device 206 may output the audio information 244 as audio content 248 using an audio output component of the computing device 206. For example, the computing device 206 may convert the digital audio signals of the audio information 244 into analog audio signals that are then provided to a speaker to generate the audio content 248.

In some embodiments, the computing device 203 may capture the image of the user 212 and generate the avatar 214 in advance and unrelated to the calculation of the expression information 232 and audio information 244. The generation of the avatar 214 may be an asynchronous activity relative to the calculation of the expression information 232 and/or the audio information 244.

In some embodiments, the computing device 202 may calculate the expression information 232 and audio information 244 in substantially real-time with when the computing device 202 captures the image of the user 212 and captures the audio content 242. The computing device 202 may then transmit the expression information 232 and the audio information 244 in substantially real-time to the computing device 206. The computing device 206 may use the expression information 232 to generate the animated avatar 218 in substantially real-time with receiving the expression information 232. The computing device 206 may use the audio information 244 to generate the audio content 248 in substantially real-time with receiving the audio information 244. As such, the system 200 may be configured to provide a real-time video call with both expression animation of the avatar 218 and audio content produced in real-time. In such embodiments, the video call may be conducted without the computing device 202 transmitting any captured images of the user 212 to the computing device 206.

FIG. 3 is a diagram of an approach for avatar generation according to some embodiments.

Image 312 depicts an image of a user that may be used as the basis for generating an avatar. The image 312 may be captured by a camera or other component of a computing device as described elsewhere herein. The image 312 may be standard digital image. For example, the image 312 may include a matrix of pixels, each pixel having a luminance value and chrominance value.

Avatar 322 depicts a highly photo-realistic avatar for the user depicted in the image 312. The avatar 322 may be generated by a computing device (e.g., the computing devices 102, 203). The avatar 322 may be generated by applying numerous modifications to the image 312. For example, the avatar 322 may be generated by applying a denoising filter to the image 312. With this approach, the avatar 322 may maintain a high degree of similarity to the face of the user as captured in the image 312, while also being an image that can be stored using less information and/or that can be more easily animated than the image 312.

Avatar 332 depicts a moderately photo-realistic avatar for the user depicted in the image 312. The avatar 322 may be generated by a computing device (e.g., the computing devices 102, 230). The avatar 332 may be generated by applying numerous modification to the image 312. For example, a denoising filter may be applied to the image 312. A blurring filter may be applied to the image 312. A smoothing filter may be applied to the image 312. The image 312 may be partially compressed. Graphical overlays may be added to the image 312, such as for the hair region, eyes region, mouth region, and/or ears region of the image 312. The graphical overlays may be chosen to have such colors and shapes that simulate the same physical features of the face of the user as captured in the image 312. Collectively, these modification may result in the avatar 332 retaining moderate similarity to the face of the user as captured in the image 312, while also being an image that can be stored using less information and/or that can be more easily animated than the image 312.

Avatar 342 depicts a slightly photo-realistic avatar for the user depicted in the image 312. The avatar 342 may be generated by a computing device (e.g., the computing devices 102, 230). The avatar 342 may be generated by applying numerous modification to the image 312. For example, an opaqueness setting may be greatly reduced for the image 312. Graphical overlays may be added to the image 312, such as for the hair region, eyes region, mouth region, and/or ears region of the image 312. The graphical overlays may be chosen to have such colors and shapes that simulate the same physical features of the face of the user as captured in the image 312. Collectively, these modification may result in the avatar 342 retaining slight similarity to the face of the user as captured in the image 312, while also being an image that can be stored using less information and/or that can be more easily animated than the image 312.

Avatar 352 depicts a non-photo-realistic avatar for the user depicted in the image 312. The avatar 352 may be a generic avatar. The avatar 352 may be generated by a computing device (e.g., the computing devices 102, 230). The avatar 352 may be a stock image that is not generated due to any particular resemblance to the face of the user as captured in the image 312. For example, the avatar 352 may be generated and used when an image (e.g., the image 312) is not available to generate a more photo-realistic. As another example, the avatar 352 may be generated and used when the user desires to use the expression transfer technology but also desires maximum privacy while using that technology.

FIG. 4A is a diagram of an approach for avatar generation according to some embodiments.

Image 411, image 412, image 413, image 414, image 415, and image 416 each depicts an image of a user that may be used as the basis for generating an avatar. The images 411, 412, 413, 414, 415, 416 may be captured by a camera or other component of a computing device as described elsewhere herein. The images 411, 412, 413, 414, 415, 416 may be standard digital images. For example, the images 411, 412, 413, 414, 415, 416 may each include a matrix of pixels, each pixel having a luminance value and chrominance value.

Avatar 402 depicts an avatar for the user depicted in the images 411, 412, 413, 414, 415, 416. The avatar 402 may be generated by a computing device (e.g., the computing devices 102, 203). The avatar 402 may be generated by combining the images 411, 412, 413, 414, 415, 416. The avatar 402 may also be generated by modifying the image resulting from the combining of images 411, 412, 413, 414, 415, 416. For example, the avatar 402 may be generated by overlaying each of the images 411, 412, 413, 414, 415, 416, modifying transparency values for the overlaid images, and applying a smoothing filter to the resulting composite image. With this approach, the avatar 402 may maintain a high degree of similarity to the face of the user as captured in the images 411, 412, 413, 414, 415, 416, while also being an image that can be stored using less information and/or that can be more easily animated than the images 411, 412, 413, 414, 415, 416. In addition, the avatar 402 may be used to create an avatar that better approximates a variety of facial expressions of the user captured in the images 411, 412, 413, 414, 415, 416.

FIG. 4B is a diagram of an approach for avatar generation according to some embodiments. Avatar 452 depicts an avatar for the user depicted in the images 411, 412, 413, 414, 415, 416. The avatar 452 may be generated by a computing device (e.g., the computing devices 102, 203). The avatar 452 may be generated by combining the images 411, 412, 413, 414, 415, 416. The avatar 452 may also be generated by modifying the image resulting from the combining of images 411, 412, 413, 414, 415, 416. For example, the avatar 452 may be generated by creating modified versions of the images 411, 412, 413, 414, 415, 416 as images 461, 462, 463, 464, 465, 466, respectively. The modified images 461, 462, 463, 464, 465, 466 may be generated by applying a denoising filter and a smoothing filter to the images 411, 412, 413, 414, 415, 416, respectively. The avatar 452 may then include each of the images 461, 462, 463, 464, 465, 466 without combining them into a single composite image. In such embodiments, a computing device animating the avatar 452 may choose from among the images 461, 462, 463, 464, 465, 466 to animate so as to use an image that most closely resembles the received expression information prior to performing animation.

FIG. 5A and FIG. 5B are diagrams of avatar animation according to some embodiments. The computing device 512 may be provided as described elsewhere herein (e.g., the computing devices 106, 206). The computing device 512 includes a display screen 514 for displaying visual images. The computing device 512 may receive both an avatar and expression information. When the computing device 512 has received an avatar but no expression information, the computing device 512 may display the avatar 522 without animation on the display screen 514. Upon receiving expression information, the computing device 512 may animate the avatar 522 to correspond to the expression indicated in the expression information. This may result in the computing device 512 displaying an animated avatar 524 on the display screen 514.

Figure 6:
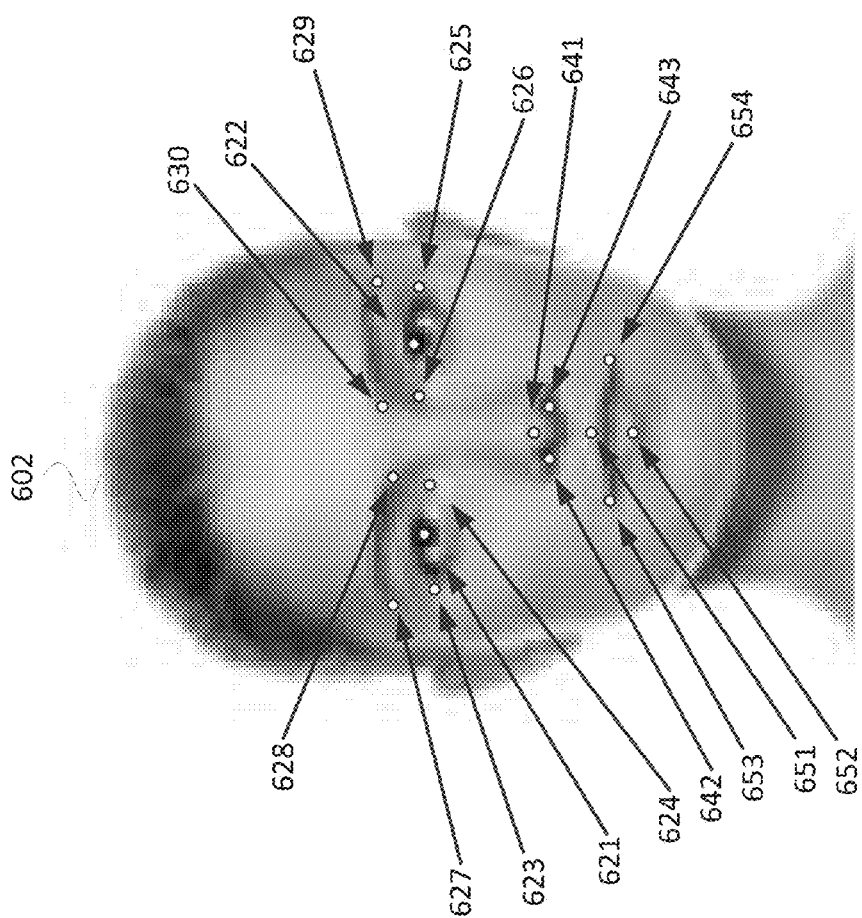
FIG. 6 is a diagram of landmark indicators on an image according to some embodiments.

FIG. 6 is a diagram of landmark indicators on an image according to some embodiments. The image 602 may be an image of a user captured by a computing device as described elsewhere wherein.

In order to calculate expression information from the image 602, a computing device (e.g., the computing devices 102, 203) may use landmark indicators on the face of the user captured by the image 602. A landmark indicator may be a position on the face of a user that is readily identifiable using computer vision techniques.

Several example follow. In these examples, left and right indicate a position as would be observed by the person who is captured in the image, which is to say that it is the mirror image of what is viewed in the image 602 itself. A landmark indicator 621 may be the center of the right pupil. A landmark indicator 622 may be the center of the left pupil. A landmark indicator 623 may be the outer corner of the right eye. A landmark indicator 624 may be the inner corner of the right eye. A landmark indicator 625 may be the outer corner of the left eye. A landmark indicator 626 may be the inner corner of the left eye. A landmark indicator 627 may be an outer end of the right eyebrow. A landmark indicator 628 may be an inner end of the right eyebrow. A landmark indicator 629 may be an outer end of the left eyebrow. A landmark indicator 630 may be an inner end of the left eyebrow. A landmark indicator 641 may be the point of the nose. A landmark indicator 642 may be the center of the right nostril. A landmark indicator 643 may be the center of the left nostril. A landmark indicator 651 may be a top-center point of the upper lip. A landmark indicator 652 may be a bottom-center point of the bottom lip. A landmark indicator 653 may be the right corner of the mouth. A landmark indicator 654 may be the left corner of the mouth. These landmark indicators are exemplary in nature, and any other landmark indicators as well as any number of landmark indicators may be used consistent with the present disclosure.

Figure 7:
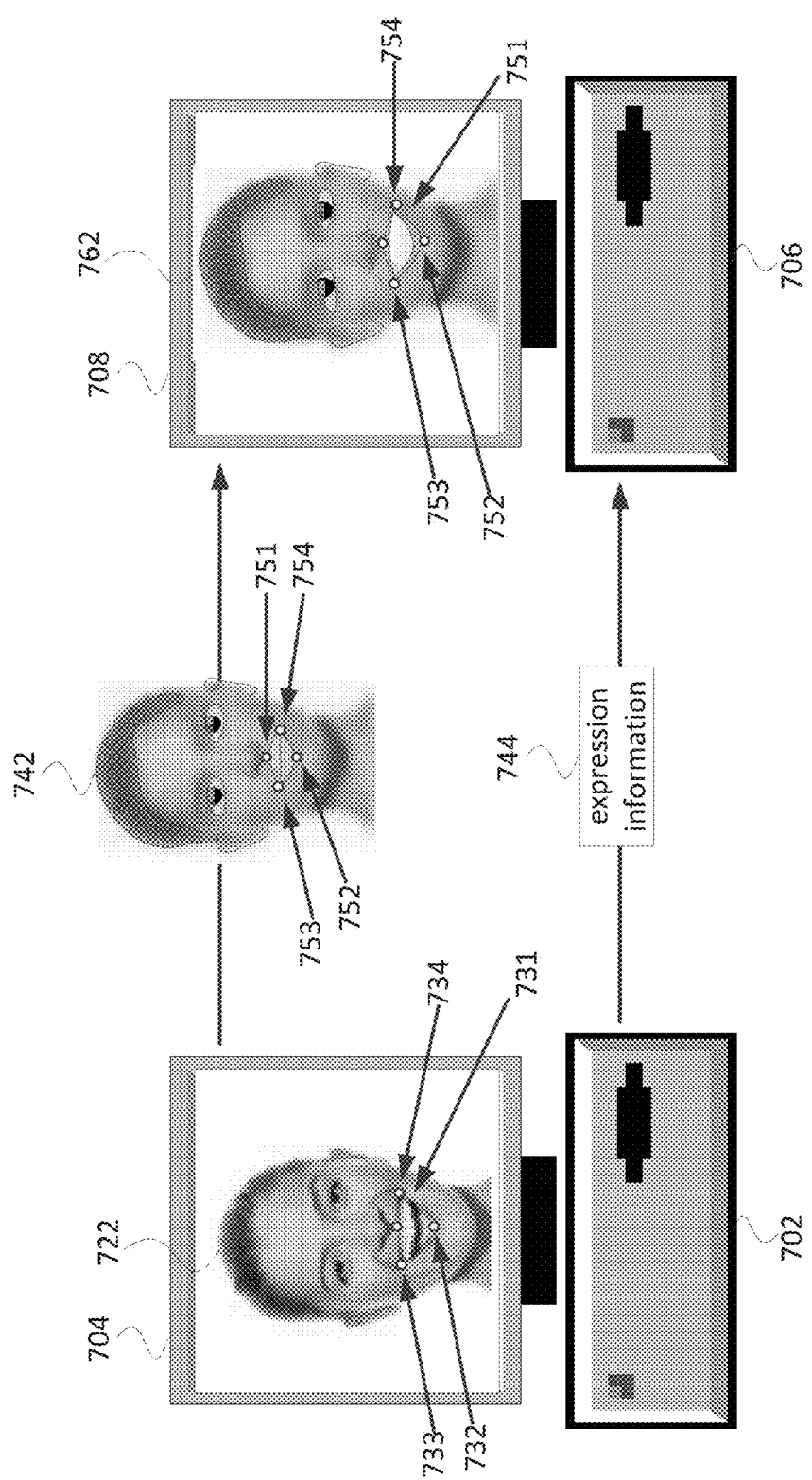
FIG. 7 is a diagram of an expression transfer system according to some embodiments.

FIG. 7 is a diagram of an expression transfer system 700 according to some embodiments. The system 700 includes a computing device 702 and a computing device 706. The computing device 702 may be provided as described elsewhere herein (e.g., the computing devices 102, 202, 203). The computing device 702 includes a display screen 704 for displaying visual images. The computing device 706 may be provided as described elsewhere herein (e.g., the computing devices 106, 206). The computing device 706 includes a display screen 708 for displaying visual images.

The computing device 702 transmits an avatar 742 to the computing device 706. The avatar 742 may be an avatar for a user of the computing device 702. The avatar 742 includes four landmark indicators. A landmark indicator 751 indicates a top-center point of the upper lip. A landmark indicator 752 indicates a bottom-center point of the lower lip. A landmark indicator 753 indicates a right corner of the mouth. A landmark indicator 754 indicates a left corner of the mouth. While other landmark indicators may be included in the avatar 742, the present explanation is limited to these four exemplary landmark indicators for the sake of clarity.

The computing device 702 displays an image 722 on the display screen 704. The image 722 may be an image of the face of a user of the computing device 702. The image 722 may be an image captured by a camera or other video input device of the computing device 702. In some embodiments, the computing device 702 may capture the image 722 but not display the image 722 on the display screen 704.

The computing device 702 generates expression information 744 using the image 722. In particular, the computing device 702 uses computer vision techniques to determine the location of a top-center of the upper lip 731, a bottom-center of the lower lip 732, a right corner of the mouth 733, and a left corner of the mouth 734. Upon identifying the location of the landmark indicators 731, 732, 733, 734, the computing device 702 may generate data indicating the location of the landmark indicators 731, 732, 733, 734 as expression information 744. The computing device 702 transmits the expression information 744 to the computing device 706.

The computing device 706 receives the avatar 742 and the expression information 744. The computing device 706 animates the avatar 742 to produce an animated avatar 762. The animated avatar 762 is based on the avatar 742 but with the landmark indicators 751, 752, 753, 754 located in the positions identified by the expression information 744. Based on this alteration of the avatar 742 by the computing device 706, the computing device 706 displays the animated avatar 762 on the display screen 708. The computing device 706 thereby displays an avatar that simulates the facial expression and (if the avatar 762 is photo-realistic) the facial characteristics of the user of the computing device 702. When the expression information is generated, transmitted, received, and used to animate the avatar 742 in real-time, the computing device 706 is able to display a real-time animated avatar that reflects the facial expressions of the user of the computing device 702 in real-time.

In some embodiments, the expression transfer technique as described with respect to the system 700, the system 100, and elsewhere herein may allow a single transmission of the avatar 742 from the computing device 702 to the computing device 706. After a single transmission of the avatar 742, multiple subsequent transmissions of the expression information 744 from the computing device 702 to the computing device 706 may be performed. Such an approach may be beneficial in order to reduce the amount of information that must be transmitted from the computing device 702 to the computing device 706. This may be important in scenarios where real-time transmission of information from the computing device 702 to the computing device 706 is necessary, such as in a video call. By transmitting the avatar 742 only once, e.g., at the beginning of the video call, the system 700 may allow real-time animation of the avatar 762 even in low bandwidth environments.

Figure 8C:
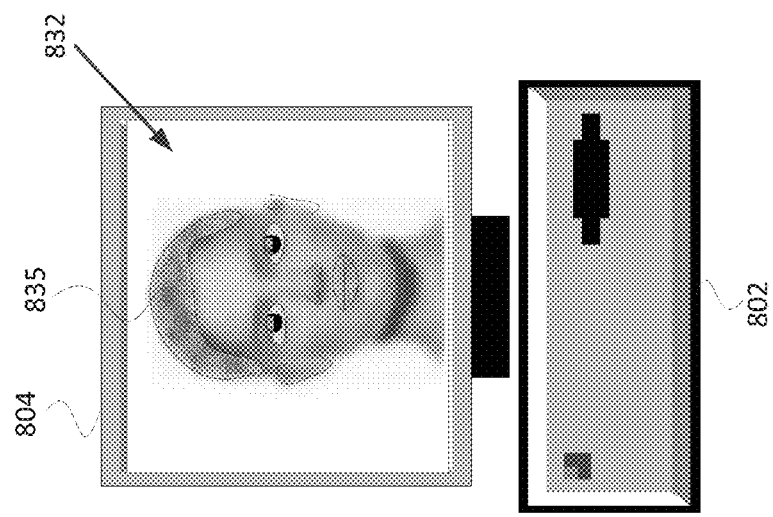
FIG. 8C is a diagram of an approach for avatar modification according to some embodiments.
Figure 8B:
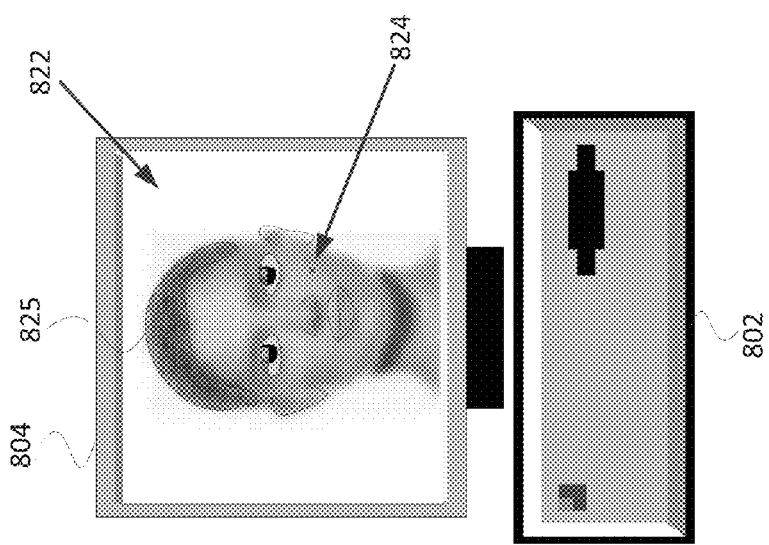
FIG. 8B is a diagram of an approach for avatar modification according to some embodiments.

FIG. 8A, FIG. 8B, and FIG. 8C are diagrams of an approach for avatar modification according to some embodiments. The computing device 802 may be provided as described elsewhere herein (e.g., the computing devices 102, 106, 202, 203, 206). The computing device 802 includes a display screen 804 for displaying visual images.

The computing device 802 displays an image 812 on the display screen 804. The image 812 may be an image of the face of a user of the computing device 802. The image 812 may be an image captured by a camera or other video input device of the computing device 802. The image 812 includes an imperfection 814 on the face of the user of the computing device 802. The imperfection 814 may be a blemish, mole, or other imperfection that naturally occurs on the face of the user of the computing device 802.

The computing device 802 displays an avatar 822 on the display screen 804. The avatar 822 is a photo-realistic avatar generated based on the image 812. Because the avatar 822 is photo-realistic and based on the image 812, it includes an imperfection 824 based on the imperfection 814. Additionally, the avatar 822 includes a hair overlay 825 with a color similar to the color of the hair of the user as captured in the image 812.

The computing device 802 displays a modified avatar 832 on the display screen 804. The computing device 802 generates the modified avatar 832 in order to change one or more visual aspects of the avatar 832. For example, the imperfection 824 present in the avatar 822 is no longer present in the avatar 832. As another example, the color of the hair overlay 835 in the avatar 832 is a different color than the color of the hair overlay 825 in the avatar 822. The computing device 802 may generate the modified avatar 832 based on input from a user of the computing device 802, based on an automatic process, or based on some other reason.

Figure 9A:
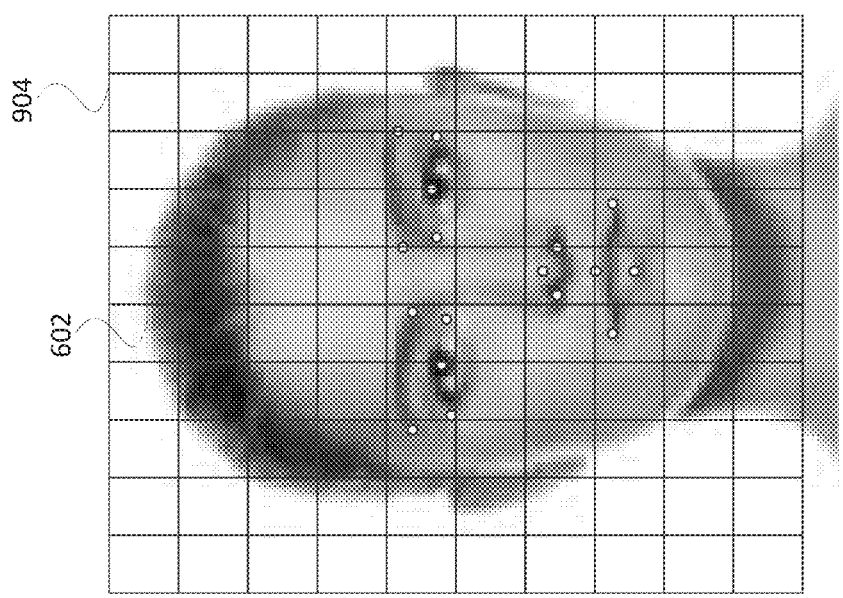
FIG. 9A is a diagram of an approach for calculation of expression information according to some embodiments.

FIG. 9A is a diagram of an approach for calculation of expression information according to some embodiments. The image 602 may be provided as described previously. In particular, the image 602 may be an image of the face of a user of a computing device. The image 602 may be an image captured by a camera or other video input device of the computing device, as described elsewhere herein. The computing device may use computer vision techniques to determine landmark indicators 621, 622, 623, 624, 625, 626, 627, 628, 629, 630, 641, 642, 643, 651, 652, 653, 654 as described previously. The landmark indicators 621, 622, 623, 624, 625, 626, 627, 628, 629, 630, 641, 642, 643, 651, 652, 653, 654 are illustrated but not labeled for the sake of clarity.

The computing device may use a grid 904 in order to calculate expression information for the image 602. The computing device may use the grid 904 as a coordinate plane. For example, any place within the grid may be identified by coordinate (vertical, horizontal) with the coordinate (0, 0) located in the top-left of the grid 904. In such an example, vertical coordinate starts at 0.0 at the top of the grid 904 and increases in value by 1.0 at each grid line. Similarly, the horizontal coordinate starts at 0.0 at the left of the grid 904 and increases in value by 1.0 at each grid line.

Using the grid 904 and the corresponding coordinate system, the computing device may determine a coordinate location for each of the landmark indicators. The computing device may calculate the landmark indicator locations and aggregate them in order to form expression information.

FIG. 9B is a diagram of expression information 920 according to some embodiments. Following from the image 612 and the grid 904 shown in FIG. 9A, the expression information 920 includes a location within the grid 904 for each landmark indicator. Here each landmark indicator 922 is identified using the reference numerals referred to elsewhere herein. Each location 924 indicates the location within the grid 904 of the corresponding landmark indicator 922 using the coordinate system described for FIG. 9A. In some embodiments, the computing device may use the expression information 920 as expression information to transmit to another computing device.

FIG. 9C is a diagram of expression information 930 according to some embodiments. In cases where the computing device has already transmitted an avatar and expression information to another computing device for animation, it may be unnecessary to send complete location values for each landmark indicator. In particular, a computing device may transmit expression information 930 that includes all landmark indicators 932 that were also included as landmark indicators 922 in FIG. 9B. However, in FIG. 9C, motion vectors 934 are used for each landmark 932 instead of an absolute grid position as used for the location values 924 in FIG. 9B.

The motion vectors 934 may be calculated as an adjustment to be made to the corresponding landmarks 932 as compared to the location where the landmark indicators were previously located. A computing device receiving the expression information 930 may add the motion vectors 934 to the location values that the computing device currently stores for each landmark indicators 932. The result may be a new location value for each of the landmark indicators 932, which the computing device may use to update the animation of the avatar.

As an example, the motion vectors 934 can be compared to the location values 924. The location values 924 correspond to the image 602, which can generally be referred to as an emotionless expression. The motion vectors 934 demonstrate that the landmark indicators 623, 625 for the outer corner of each eye have moved slightly outwards. The landmark indicators 628, 630 for the inner corner of each eyebrow have moved slightly upwards. The landmark indicators 651, 652 for the center of the lips indicate that the mouth has opened considerably. The landmark indicators 653, 654 for the corners of the mouth indicate that the mouth has widened. Collectively, the motion vectors 934 indicate that the user has transitioned from the emotionless expression of the image 602 and the expression information 920 to a "smiling" or "happy" expression.

Figure 9D:
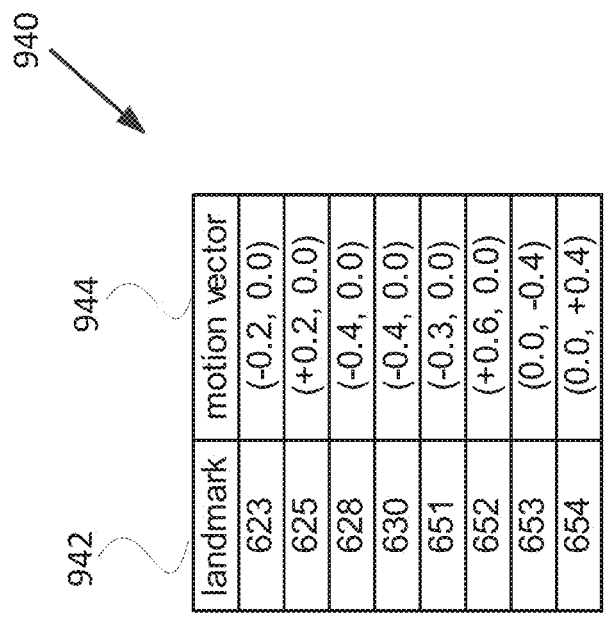
FIG. 9D is a diagram of an approach for calculation of expression information according to some embodiments.

FIG. 9D is a diagram of expression information 940 according to some embodiments. The expression information 940 includes landmark indicators 942 and motion vectors 944. In embodiments where the expression information includes motion vectors, it may be advantageous to not include landmark indicators that have a motion vector of (0.0, 0.0), which indicates no movement of the landmark indicator. For such landmark indicators, the receiving computing device does not need to update the location of that landmark indicator or update the animation for that landmark indicator, so it may be unnecessary to transmit that information to the receiving computing device. Furthermore, by not transmitting landmark indicators that have a motion vector of (0.0, 0.0), the expression transfer technique may require an even further reduced amount of bandwidth to transmit expression information.

The expression information 940 can be compared to the expression information 930, where the former includes the same motion vectors but has all landmark indicators and corresponding motion vectors removed where the motion vector is (0.0, 0.0).

Figure 10:
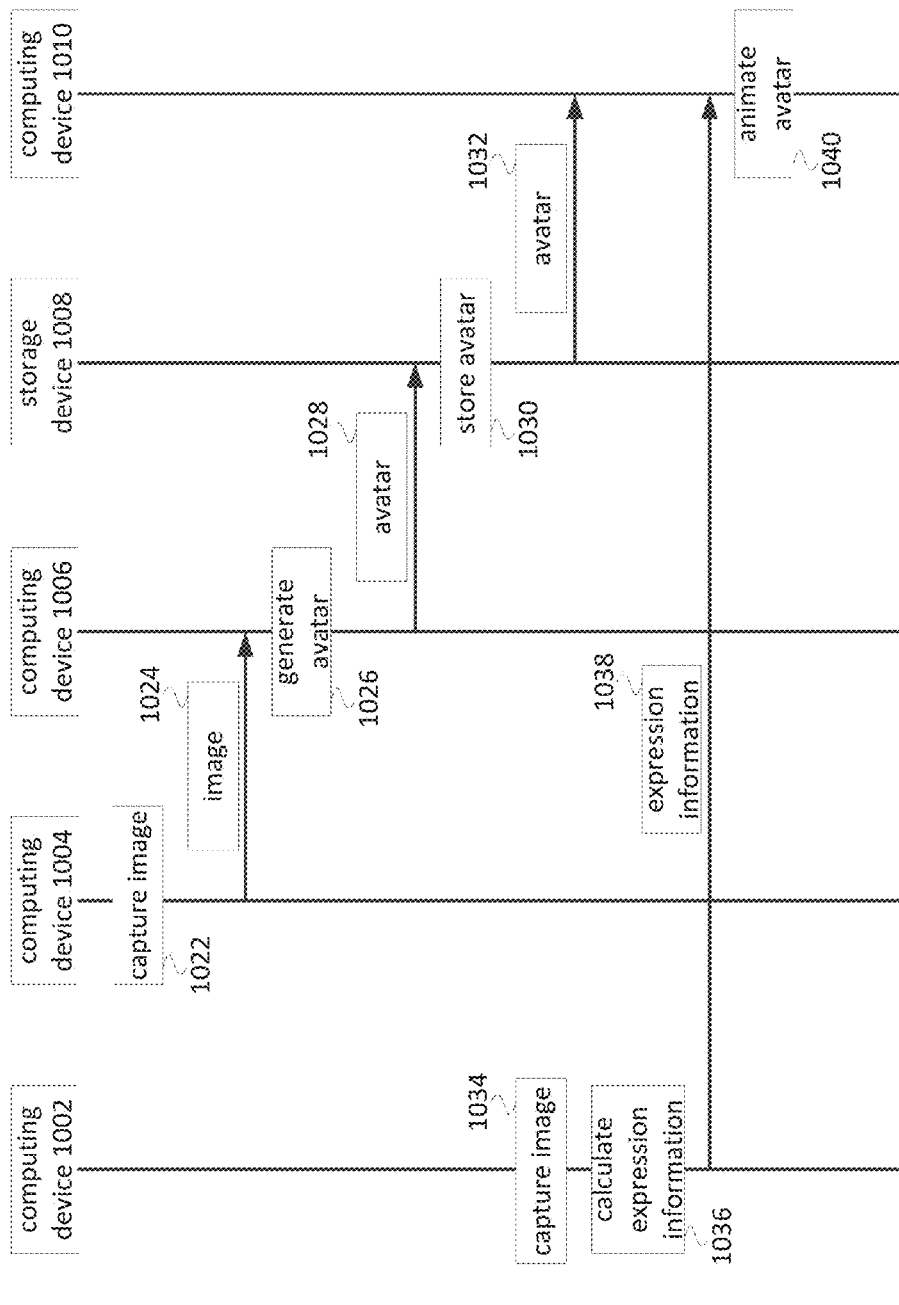
FIG. 10 is a sequence diagram of a process for expression transfer according to some embodiments.

FIG. 10 is a sequence diagram of a process 1000 for expression transfer according to some embodiments. The process 1000 may be performed using a computing device 1002, a computing device 1004, a computing device 1006, a storage device 1008, and a computing device 1010. The computing devices 1002, 2004, 2006, 1010 may be provided as described elsewhere herein (e.g., computing devices 102, 106, 202, 203, 206). The storage device 1008 may be provided as an electronic device with storage media (e.g., network attached storage).

At block 1022, the computing device 1004 captures an image. The image may be an image of the face of a user of the computing device 1004.

At block 1024, the computing device 1004 transmits the image captured at the block 1022 to the computing device 1006.

At block 1026, the computing device 1006 generates an avatar. The block 1026 may include the computing device 1006 generating an avatar using the image captured at the block 1022 (e.g., as described with respect to FIGS. 3, 4A, 4B).

At block 1028 the computing device 1006 transmits the avatar to the storage device 1008.

At block 1030, the storage device 1008 stores the avatar. The block 1030 may include the storage device 1008 storing the avatar for future on-demand use.

At block 1032, the storage device 1008 transmits the avatar to the computing device 1010. The block 1032 may include the storage device 1008 transmitting the avatar to the computing device 1010 based on the storage device 1008 receiving an indication (e.g., from the computing device 1002) that the storage device 1008 should transmit the avatar to the computing device 1010 (e.g., because the computing device 1002 is initiating a video call to the computing device 1010).

At the block 1034, the computing device 1002 captures an image. The image may be an image of the face of a user of the computing device 1002, which may be the same user for which the image was captured at the block 1022.

At the block 1036, the computing device 1002 calculates expression information 1036. The block 1036 may include the computing device 1002 calculating the expressing information based on the image captured at the block 1034 (e.g., as described with respect to FIGS. 6, 7, 9A, 9B, 9C, 9D).

At the block 1038, the computing device 1002 transmits the expression information to the computing device 1010.

At block 1040, the computing device 1010 animates the avatar. The block 1040 may include the computing device 1010 animating the avatar received at the block 1032 using the expression information received at the block 1038 (e.g., as described with respect to FIGS. 5A, 5B, 7, 9A, 9B, 9C, 9D).

The process 1000 can be modified in various ways in accordance with the present disclosure. For example, the activities performed by the computing devices 1002, 1004, 1006 and/or the storage device 1008 may be performed by a single computing device. Alternatively, more computing devices may be used.

Figure 11:
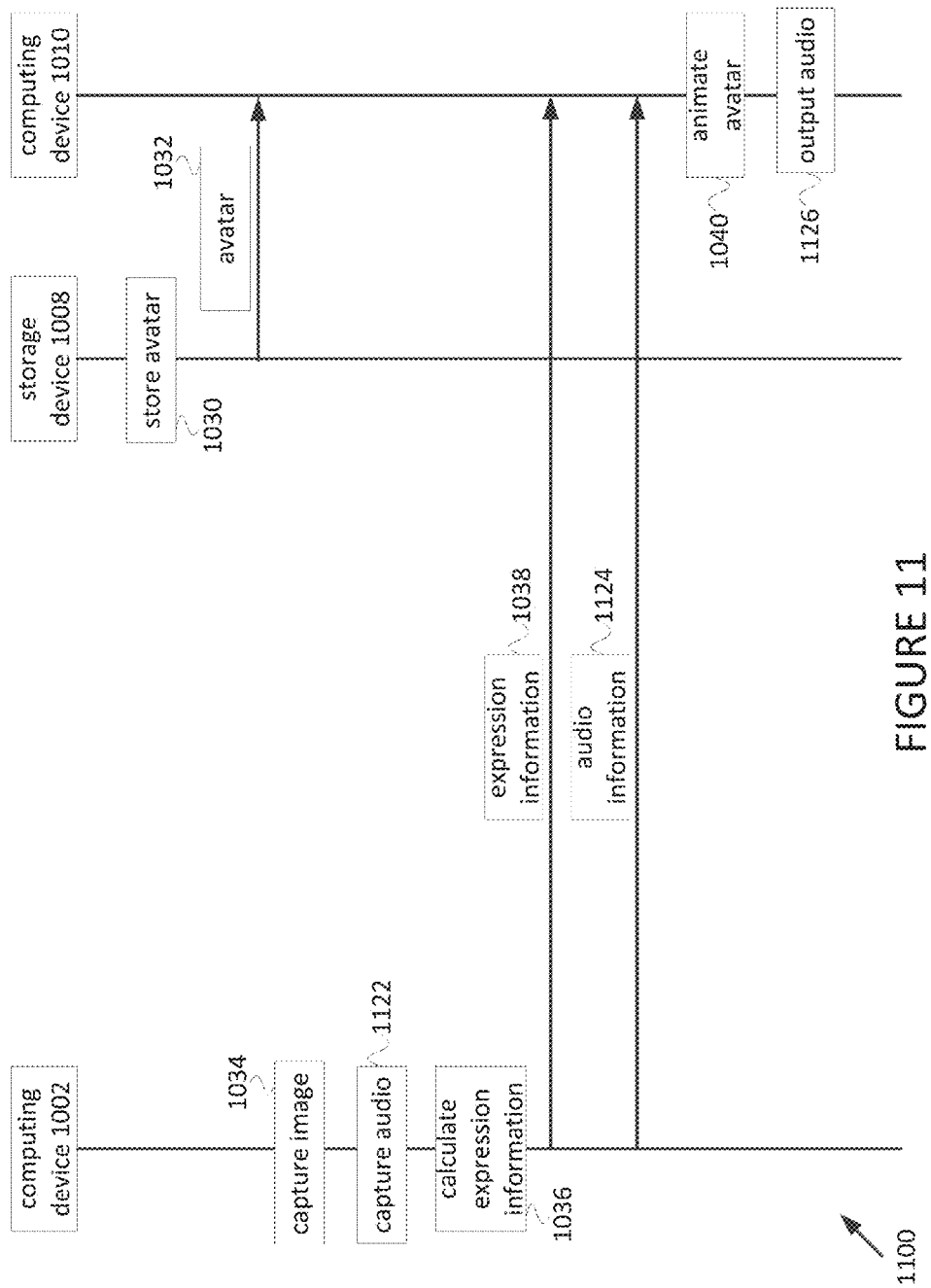
FIG. 11 is a sequence diagram of a process for expression transfer according to some embodiments.

FIG. 11 is a sequence diagram of a process 1100 for expression transfer according to some embodiments. The process 1100 may be performed using the computing device 1002, the storage device 1008, and the computing device 1010 as described previously. The process 1100 may be performed in addition to or as an alternative to the process 1000 described with respect to the FIG. 10.

At the block 1030, the storage device 1008 stores the avatar. The block 1030 may include the storage device 1008 storing the avatar for future on-demand use.

At the block 1032, the storage device 1008 transmits the avatar to the computing device 1010. The block 1032 may include the storage device 1008 transmitting the avatar to the computing device 1010 based on the storage device 1008 receiving an indication (e.g., from the computing device 1002) that the storage device 1008 should transmit the avatar to the computing device 1010 (e.g., because the computing device 1002 is initiating a video call to the computing device 1010).

At the block 1034, the computing device 1002 captures an image. The image may be an image of the face of a user of the computing device 1002, which may be the same user for which the image was captured at the block 1022.

At the block 1122, the computing device 1002 captures audio. The block 1122 may include the computing device 1002 using an audio input device (e.g., a microphone) to capture audio content (e.g., as described with respect to FIG. 2).

At the block 1036, the computing device 1002 calculates expression information 1036. The block 1036 may include the computing device 1002 calculating the expressing information based on the image captured at the block 1034 (e.g., as described with respect to FIGS. 6, 7, 9A, 9B, 9C, 9D).

At the block 1038, the computing device 1002 transmits the expression information to the computing device 1010.

At block 1124, the computing device 1002 transmits audio information to the computing device 1010. The block 1124 may include the computing device 1002 transmitting audio information generated based on the audio captured at the block 1122 (e.g., as described with respect to FIG. 2).

At the block 1040, the computing device 1010 animates the avatar. The block 1040 may include the computing device 1010 animating the avatar received at the block 1032 using the expression information received at the block 1038 (e.g., as described with respect to FIGS. 5A, 5B, 7, 9A, 9B, 9C, 9D).

At the block 1126, the computing device 1010 outputs audio. The block 1126 may include the computing device 1010 outputting audio using an audio output device (e.g., a speaker) based on the audio information received at the block 1124 (e.g., as described with respect to FIG. 2).

The process 1100 can be modified in various ways in accordance with the present disclosure. For example, the activities performed by the computing devices 1002, 1004, 1006 and/or the storage device 1008 may be performed by a single computing device. Alternatively, more computing devices may be used.

Figure 12:
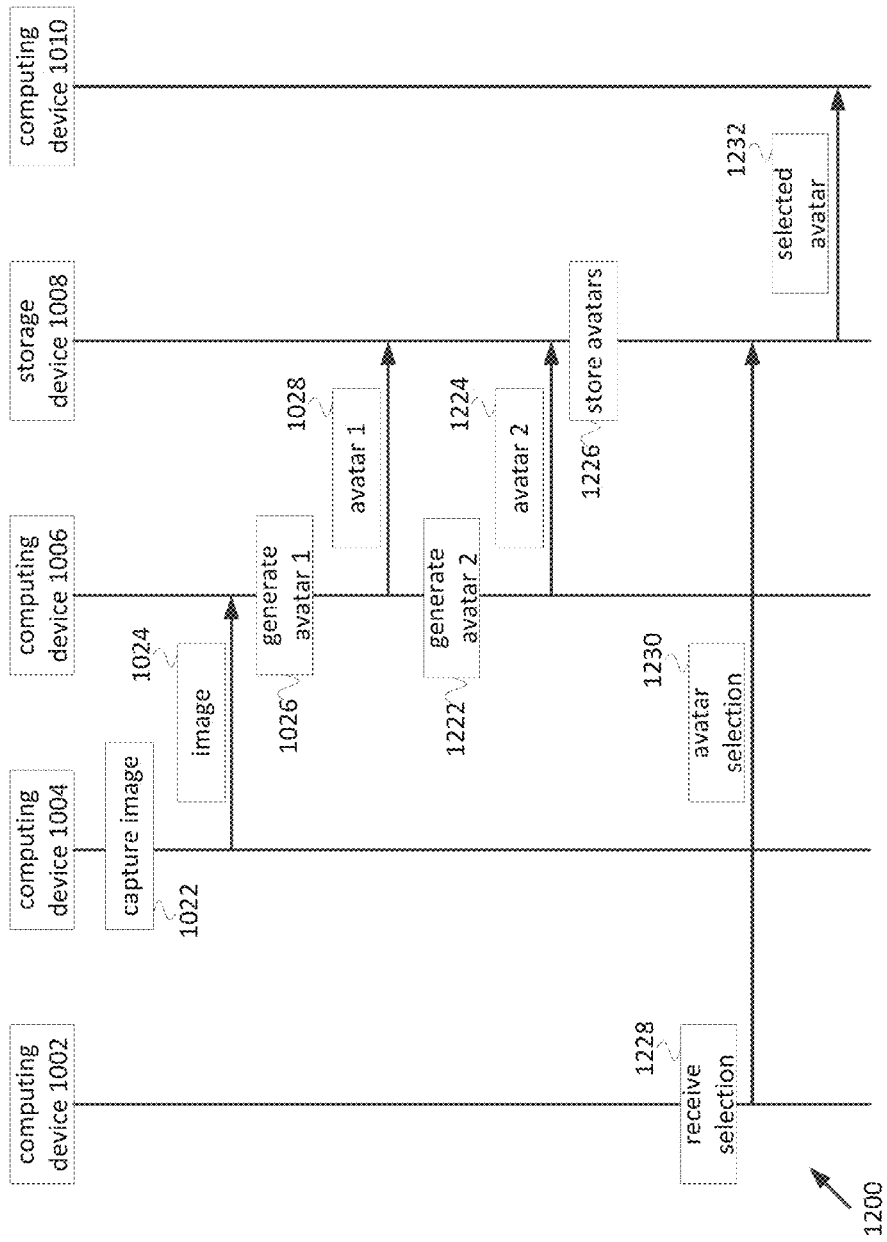
FIG. 12 is a sequence diagram of a process for expression transfer according to some embodiments.

FIG. 12 is a sequence diagram of a process 1200 for expression transfer according to some embodiments. The process 1200 may be performed using the computing device 1002, the computing device 1004, the computing device 1006, the storage device 1008, and the computing device 1010 as described previously. The process 1200 may be performed in addition to or as an alternative to the process 1000 described with respect to the FIG. 10.

At the block 1022, the computing device 1004 captures an image. The image may be an image of the face of a user of the computing device 1004.

At the block 1024, the computing device 1004 transmits the image captured at the block 1022 to the computing device 1006.

At the block 1026, the computing device 1006 generates an avatar 1. The block 1026 may include the computing device 1006 generating an avatar 1 using the image captured at the block 1022 (e.g., as described with respect to FIGS. 3, 4A, 4B).

At the block 1028 the computing device 1006 transmits the avatar 1 to the storage device 1008.

At block 1222, the computing device 1006 generates an avatar 2. The block 1222 may include the computing device 1006 generating an avatar 2 using the image captured at the block 1022 (e.g., as described with respect to FIGS. 3, 4A, 4B). The block 1222 may include the computing device 1006 generating an avatar 2 using an image different from the image captured at the block 1022 (e.g., as described with respect to FIGS. 3, 4A, 4B). The avatar 2 may be a different avatar from the avatar 1. For example, the avatar 1 may be a photo-realistic avatar while the avatar 2 may be a non-photo-realistic generic avatar.

At the block 1224 the computing device 1006 transmits the avatar 2 to the storage device 1008.

At block 1226, the storage device 1008 stores the avatar 1 and the avatar 2. The block 1226 may include the storage device 1008 storing the avatar 1 and the avatar 2 for future on-demand use.

At block 1228, the computing device 1002 receives a selection. The block 1228 may include the computing device 1002 receiving a selection by a user of the computing device 1002 between the avatar 1 and the avatar 2. The selection received at the block 1228 may be received based on the user interacting with a user interface of the computing device 1002.

At block 1230, the computing device 1002 transmits an avatar selection to the storage device 1008. The block 1230 may include the computing device 1002 transmitting an indication of either the avatar 1 or the avatar 2 based on the selection received as the block 1228.

At block 1232, the storage device 1008 transmits a selected avatar to the computing device 1010. The block 1232 may include the storage device transmitting either the avatar 1 or the avatar 2 to the computing device 1010 based on the avatar selection indication received at the block 1230.

The process 1200 can be modified in various ways in accordance with the present disclosure. For example, the activities performed by the computing devices 1002, 1004, 1006 and/or the storage device 1008 may be performed by a single computing device. Alternatively, more computing devices may be used.

Figure 13:
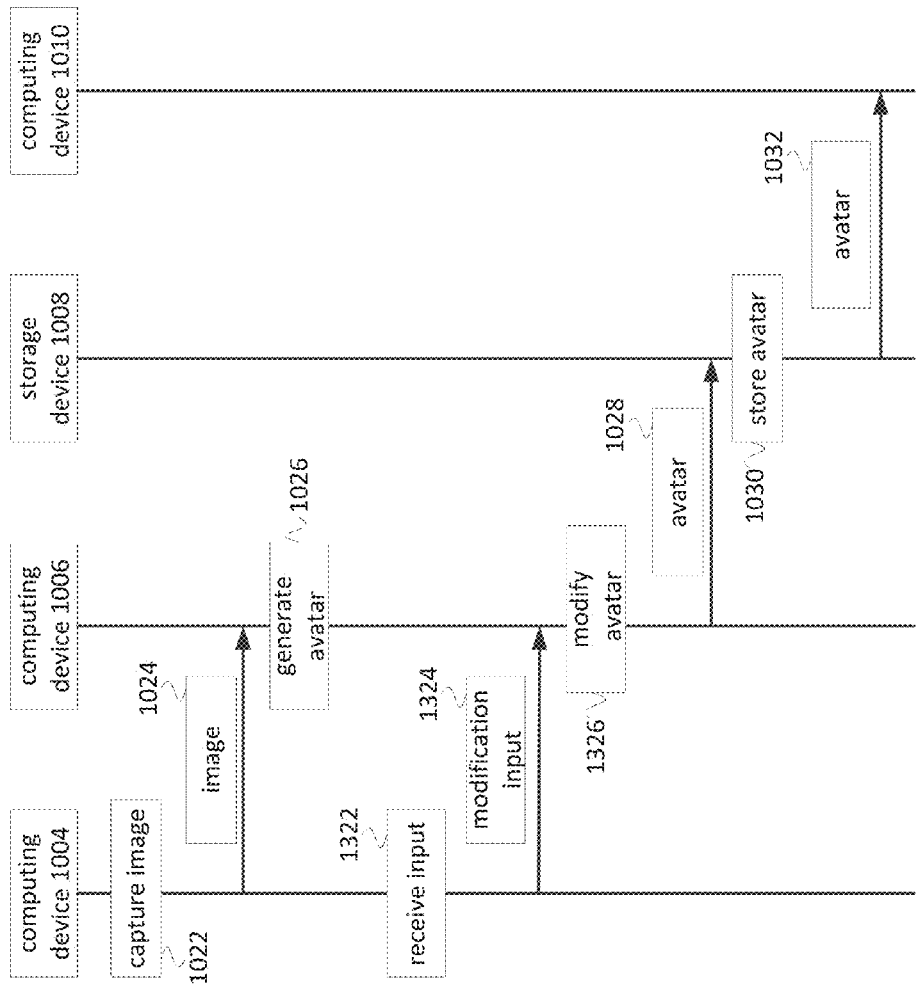
FIG. 13 is a sequence diagram of a process for expression transfer according to some embodiments.

FIG. 13 is a sequence diagram of a process 1300 for expression transfer according to some embodiments. The process 1300 may be performed using the computing device 1004, the computing device 1006, the storage device 1008, and the computing device 1010 as described previously. The process 1300 may be performed in addition to or as an alternative to the process 1000 described with respect to the FIG. 10.

At the block 1022, the computing device 1004 captures an image. The image may be an image of the face of a user of the computing device 1004.

At the block 1024, the computing device 1004 transmits the image captured at the block 1022 to the computing device 1006.

At the block 1026, the computing device 1006 generates an avatar. The block 1026 may include the computing device 1006 generating an avatar using the image captured at the block 1022 (e.g., as described with respect to FIGS. 3, 4A, 4B).

At block 1322, the computing device 1004 receives input. The block 1322 may include the computing device 1004 receiving an input from a user indicating a modification that the user desires to make to the avatar generated at the block 1026 or the image captured at the block 1022.

At block 1324, the computing device 1004 transmits modification input to the computing device 1006. The block 1324 may include the computing device 1004 transmitting an indication of a modification to make to the avatar generated at the block 1026 as indicated by the input received at the block 1322.

At block 1326, the computing device 1006 modifies the avatar. The block 1326 may include the computing device 1006 modifying a visual aspect of the avatar generated at the block 1026 based on the modification input received at the block 1324 (e.g., as described with respect to FIGS. 8A, 8B, 8C).

At the block 1028 the computing device 1006 transmits the modified avatar to the storage device 1008.

At the block 1030, the storage device 1008 stores the modified avatar. The block 1030 may include the storage device 1008 storing the modified avatar for future on-demand use.

At the block 1032, the storage device 1008 transmits the modified avatar to the computing device 1010. The block 1032 may include the storage device 1008 transmitting the modified avatar to the computing device 1010 based on the storage device 1008 receiving an indication (e.g., from the computing device 1002) that the storage device 1008 should transmit the modified avatar to the computing device 1010 (e.g., because the computing device 1002 is initiating a video call to the computing device 1010).

The process 1100 can be modified in various ways in accordance with the present disclosure. For example, the activities performed by the computing devices 1002, 1004, 1006 and/or the storage device 1008 may be performed by a single computing device. Alternatively, more computing devices may be used.

Figure 14:
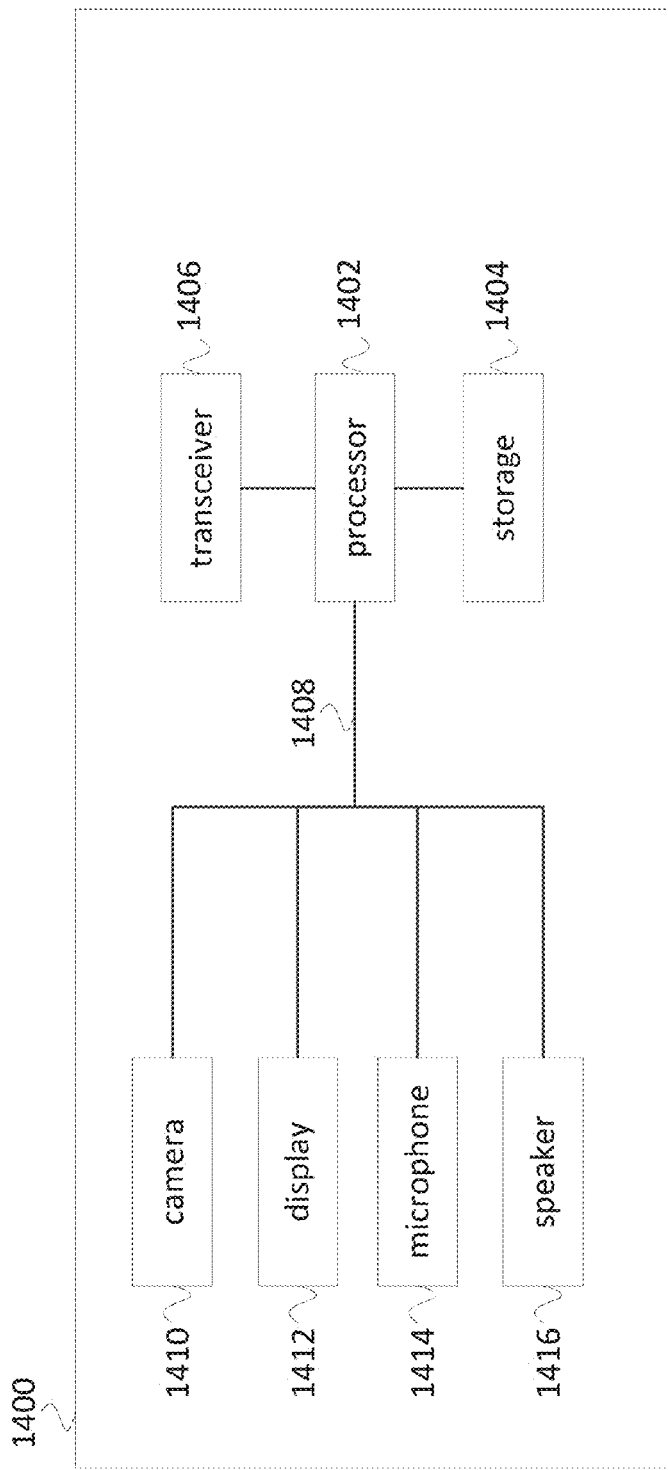
FIG. 14 is a schematic diagram of a computing device that may be used for expression transfer according to some embodiments.

FIG. 14 is a schematic diagram of a computing device 1400 that may be used for expression transfer according to some embodiments. The computing device 1400 may be provided as a computing device as described elsewhere herein (e.g., as the computing devices 102, 106, 202, 203, 206, 512, 702, 706, 802, 1002, 1004, 1006, 1010 and/or storage device 1008).

The computing device 1400 includes a processor 1402, a storage 1404, a transceiver 1406, a bus 1408, a camera 1410, a display 1412, a microphone 1414, and a speaker 1416.

The processor 1402 may be a processor used to generate an avatar, calculate expression information, and/or animate an avatar. The processor 1402 may be provided as a general purpose microprocessor, a special purpose microprocessor, a field programmable gate array, or in some other fashion as generally used in the electronic arts.

The storage 1404 may be a storage medium used to store an avatar, expression information, an image, and/or a modified avatar. The storage 1404 may be provided as a volatile memory, as a non-volatile memory, as a hard disk, as a flash memory, as a cache, or in some other fashion as generally used in the electronic arts.

The transceiver 1406 may be a transmitter and/or receiver used to transmit and/or receive images, avatars, expression information, and/or selections. The transceiver 1406 may be provided as a short-range transceiver, a long-range transceiver, a cellular network transceiver, a local area network transceiver, or in some other fashion as generally used in the electronic arts.

The bus may be an electronic bus connecting the processor 1402 to the camera 1410, the display 1412, the microphone 1414, and/or the speaker 1416.

The camera 1410 may be a camera used to capture an image. The camera may be provided as a digital camera, a still-image camera, a video camera, a two-dimensional camera, a three-dimensional camera, a fish-eye camera, or in some other fashion as generally used in the electronic arts.

The display 1412 may be a display used to display an image, an avatar, a modified avatar, and/or an animated avatar. The display 1412 may be provided as a flat screen, as an LCD, as a plasma screen, or in some other fashion as generally used in the electronic arts.

The microphone 1414 may be a microphone used to capture audio content. The microphone 1414 may be provided as a built-in microphone, as a large diaphragm condenser microphone, or in some other fashion as generally used in the electronic arts.

The speaker 1416 may be a speaker used for outputting audio content. The speaker 1416 may be provided as a built-in speaker, a stereo pair of speakers, or in some other fashion as generally used in the electronic arts.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method comprising:
capturing a first image of a face of a person;
generating an avatar based on the first image of the face of the person, wherein the avatar approximates the first image of the face of the person;
transmitting the avatar to a destination device;
capturing a second image of the face of the person on a source device;
calculating expression information based on the second image of the face of the person, wherein the expression information approximates an expression on the face of the person as captured in the second image;
transmitting the expression information from the source device to the destination device;
animating the avatar on a display component of the destination device using the expression information;
capturing a third image of a face of a second person;
generating a second avatar based on the third image of the face of the second person, wherein the second avatar approximates the third image of the face of the second person;
transmitting the second avatar to the source device;
capturing a fourth image of the face of the second person on the destination device;
calculating second expression information based on the fourth image of the face of the second person, wherein the second expression information approximates an expression on the face of the second person as captured in the fourth image;
transmitting the second expression information from the destination device to the source device; and
animating the second avatar on a display component of the source device using the second expression information,
wherein the transmitting the expression information from the source device to the destination device is performed after the transmitting the avatar to the destination device.

2. The method of claim 1,
wherein the avatar is a photo-realistic avatar used to simulate a presence of the person during a video call with a user of the destination device.

3. The method of claim 2,
wherein the transmitting the avatar to the destination device is performed at most one time during the video call, and
wherein the transmitting the expression information from the source device to the destination device is performed more than once during the video call.

4. The method of claim 1,
wherein the transmitting the expression information and the transmitting the second expression information are performed substantially simultaneously.

5. The method of claim 4,
wherein the animating the avatar on the display component of the destination device using the expression information includes animating the avatar in a virtual reality environment.

6. The method of claim 1,
wherein the calculating the expression information, the transmitting the expression information, and the animating the avatar are performed substantially in real-time with the capturing the second image of the face of the person.

7. The method of claim 1, further comprising:
capturing audio information using an audio input component of the source device;
transmitting the audio information from the source device to the destination device; and
outputting the audio information using the destination device.

8. The method of claim 7,
wherein the capturing the audio information, the transmitting the audio information, and the outputting the audio information are performed substantially in real-time with the capturing the second image of the face of the person.

9. The method of claim 1, wherein the expression information comprises facial landmark indicators.

10. The method of claim 1, wherein the expression information comprises a motion vector of facial landmark indicators.

11. The method of claim 1, further comprising:
generating a third avatar that approximates the face of the person;
receiving a user input indicating a facial avatar to use; and
selecting the avatar based on the user input, wherein the selecting the avatar is performed prior to the transmitting the avatar to the destination device.

12. The method of claim 11,
wherein the avatar is a photo-realistic avatar, and
wherein the third avatar is a generic avatar.

13. The method of claim 1, wherein the real-time image of the face of the person is not transmitted from the source device to the destination device.

14. The method of claim 1, further comprising:
receiving a user input to modify a visual aspect of the avatar; and
modifying a visual aspect of the avatar based on the received user input,
wherein the receiving the user input and the modifying the visual aspect of the avatar are performed prior to the transmitting the avatar to the destination device.

15. A system comprising:
one or more source devices configured to:
capture a first image of a face of a person;
generate an avatar based on the first image of the face of the person, wherein the avatar approximates the first image of the face of the person;
transmit the avatar to a destination device;
capture a second image of the face of the person;
calculate expression information based on the second image of the face of the person, wherein the expression information approximates an expression on the face of the person as captured in the second image;
transmit the expression information to the destination device; and
the destination device configured to:
animate the avatar on a display component using the expression information;
capture a third image of a face of a second person;
generate a second avatar based on the third image of the face of the second person, wherein the second avatar approximates the third image of the face of the second person;
transmit the second avatar to the source device;
capture a fourth image of the face of the second person;
calculate second expression information based on the fourth image of the face of the second person, wherein the second expression information approximates an expression on the face of the second person as captured in the fourth image; and
transmit the second expression information to the source device,
wherein the one or more source devices are further configured to animate the second avatar on a display component using the second expression information,
wherein the source device is configured to transmit the expression information to the destination device after transmitting the avatar to the destination device.

16. The system of claim 15,
wherein the one or more source devices are configured to capture the second image of the face of the person, calculate the expression information, and transmit the expression information substantially in real-time with the destination device animating the avatar.

17. The system of claim 15,
wherein the one or more source devices are further configured to:
capture audio information using an audio input component; and
transmit the audio information to the destination device; and
wherein the destination device is further configured to:
output the audio information.

18. The system of claim 17,
wherein the one or more source devices is configured to capture the second image of the face of the person, capture the audio information, and transmit the audio information substantially in real-time with the destination device outputting the audio information.

19. The system of claim 15, wherein the expression information comprises facial landmark indicators.

* * * * *